(12) United States Patent
Chhabra

(10) Patent No.: US 11,354,445 B2
(45) Date of Patent: *Jun. 7, 2022

(54) MECHANISM TO PROTECT A DISTRIBUTED REPLICATED STATE MACHINE

(71) Applicant: Amazon Technologies, Inc., Seattle, WA (US)

(72) Inventor: Jasmeet Chhabra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,937

(22) Filed: Oct. 28, 2019

(65) Prior Publication Data

US 2020/0074119 A1 Mar. 5, 2020

Related U.S. Application Data

(63) Continuation of application No. 15/708,074, filed on Sep. 18, 2017, now Pat. No. 10,460,130.

(51) Int. Cl.
*G06F 21/64* (2013.01)
*G06F 11/10* (2006.01)
(Continued)

(52) U.S. Cl.
CPC .......... *G06F 21/64* (2013.01); *G06F 11/1004* (2013.01); *G06F 16/21* (2019.01); *H04L 9/30* (2013.01)

(58) Field of Classification Search
USPC ....................................................... 713/193
See application file for complete search history.

(56) References Cited

U.S. PATENT DOCUMENTS 5,544,255 A 8/1996 Smithies et al.
7,558,954 B2 7/2009 Apostolopoulos et al.
(Continued)

OTHER PUBLICATIONS

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from https://nvlpubs.nist.gov/nistpubs/Legacy/SP/nistspecialpublication800-107r1.pdf, 25 pages.

(Continued)

*Primary Examiner* — Badri Narayanan Champakesan
(74) *Attorney, Agent, or Firm* — Davis Wright Tremaine LLP

(57) ABSTRACT

A database server (e.g., a replica) generates a local checksum from a sequence of database operations and contributes the sequence of operations and the local checksum to a shared log of a distributed database. Additional database servers, similarly, generate local checksums. A checksum replica agent determines a first ordering of database operations of a first database server of a database, determines a second ordering of database operations of a second database server of the database; determines whether a third ordering of database operations that is based at least in part on the first ordering and the second ordering is valid. In an embodiment, a checksum replica agent generates a global checksum over the third ordering. Checksums, in an embodiment, are digitally signed and/or encrypted.

20 Claims, 11 Drawing Sheets

(51) Int. Cl.
*H04L 9/30* (2006.01)
*G06F 16/21* (2019.01)

(56) References Cited

U.S. PATENT DOCUMENTS

| | | | |
|---|---|---|---|
| 7,739,233 | B1 | 6/2010 | Ghemawat et al. |
| 8,473,816 | B2 | 6/2013 | Zvibel |
| 8,533,851 | B2* | 9/2013 | Ginter .................. H04L 63/104 |
| | | | 726/27 |
| 8,788,842 | B2 | 7/2014 | Brouwer et al. |
| 9,569,634 | B1* | 2/2017 | Yanacek ............. H04L 63/0815 |
| 9,832,022 | B1* | 11/2017 | Pedersen ............... H04L 9/3247 |
| 10,460,130 | B1* | 10/2019 | Chhabra ............... H04L 9/3247 |
| 2002/0049909 | A1* | 4/2002 | Jackson ............. G06Q 20/3674 |
| | | | 713/188 |
| 2002/0080973 | A1* | 6/2002 | Cromer .................. G06F 21/31 |
| | | | 380/282 |
| 2004/0162989 | A1* | 8/2004 | Kirovski ................ G06F 21/64 |
| | | | 713/189 |
| 2006/0026441 | A1* | 2/2006 | Aaron .................... G06F 21/86 |
| | | | 713/187 |
| 2008/0133909 | A1* | 6/2008 | You ....................... H04L 63/166 |
| | | | 713/161 |
| 2008/0222418 | A1* | 9/2008 | Futa .................... G06F 9/30007 |
| | | | 713/176 |
| 2010/0217752 | A1 | 8/2010 | Deenadhayalan et al. |
| 2013/0111440 | A1 | 5/2013 | Forster et al. |
| 2013/0195266 | A1* | 8/2013 | Fischer ................. H04L 9/0861 |
| | | | 380/44 |
| 2013/0263255 | A1* | 10/2013 | Wolf ....................... G06F 21/64 |
| | | | 726/21 |
| 2014/0075567 | A1 | 3/2014 | Raleigh et al. |
| 2014/0289833 | A1* | 9/2014 | Briceno .................. H04L 63/08 |
| | | | 726/7 |
| 2016/0098555 | A1* | 4/2016 | Mersh .................... G06F 21/51 |
| | | | 713/187 |
| 2017/0063814 | A1* | 3/2017 | Wachs .................. H04L 9/0861 |
| 2017/0091020 | A1 | 3/2017 | Rat et al. |
| 2017/0310653 | A1* | 10/2017 | Zhang ................... H04L 9/3242 |
| 2018/0060143 | A1 | 3/2018 | Uttamchandani et al. |
| 2018/0062852 | A1* | 3/2018 | Schmahmann ............ H04L 9/14 |
| 2018/0204191 | A1* | 7/2018 | Wilson ................. H04L 9/3242 |
| 2018/0309578 | A1* | 10/2018 | Farrell .................... G06F 21/44 |

OTHER PUBLICATIONS

MitreCorpN PL: (Year: 2013) (Author: Richard).
SRI International NPL: (Year: 2013) (Author: Dorothy).

* cited by examiner

MECHANISM TO PROTECT A DISTRIBUTED REPLICATED STATE MACHINE

CROSS-REFERENCE TO RELATED APPLICATIONS

This application is a continuation of U.S. patent application Ser. No. 15/708,074, filed on Sep. 18, 2017, entitled "MECHANISM TO PROTECT A DISTRIBUTED REPLICATED STATE MACHINE," and issued as U.S. Pat. No. 10,460,130 on Nov. 29, 2019, which is incorporated herein by reference for all purposes.

BACKGROUND

In many contexts, a distributed system is utilized for various purposes, such as to improve the availability, performance, and/or reliability of data in the distributed system. In many cases, a distributed system includes various components including multiple replicas of data which may be modified independently of each other and a shared log that is utilized as a coordination mechanism between the various replicas. Replicas may contribute data to the shared log, which is serialized into an ordered sequence. In some cases, different computing entities and/or organizations host/control the operation of the replica and shared log. In many cases, it is difficult or even impossible for a computing entity controlled by a first organization to determine whether a shared log controlled by a second organization may have altered (e.g., maliciously or inadvertently) the ordering of data contributed to the shared log.

BRIEF DESCRIPTION OF THE DRAWINGS

Various techniques will be described with reference to the drawings, in which.

DETAILED DESCRIPTION

Figure 1:
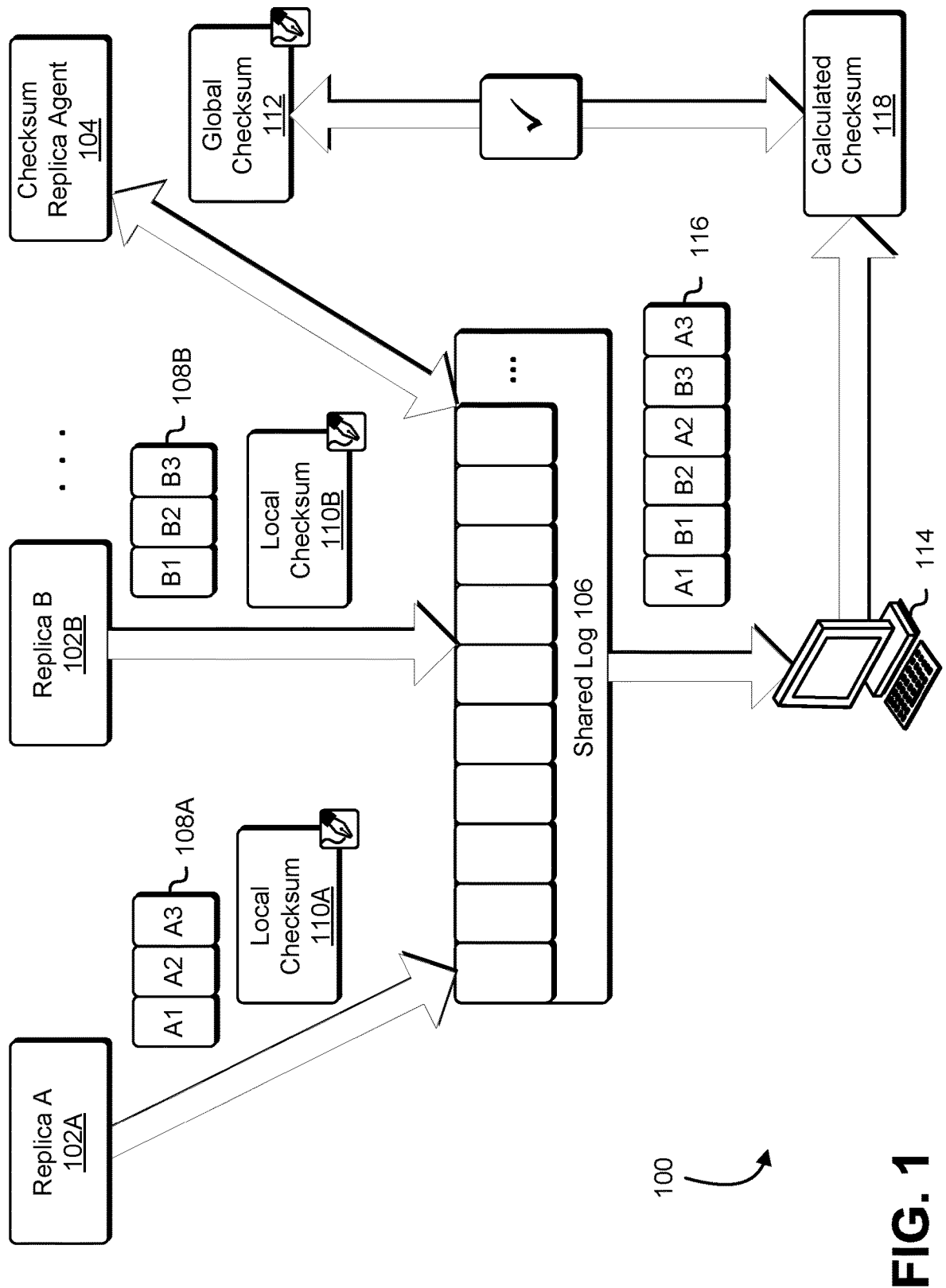
FIG. 1 illustrates a system in which one embodiment may be practiced.

In an embodiment, local and/or global checksums are utilized as a mechanism to protect the integrity of data that is provided to a shared log by replicas. In an embodiment, a distributed system is a distributed database that includes one or more replicas that can have distinct views (e.g., the state of a first database replica differs from that of another database replica) of a shared log which includes an ordered sequence of operations. Replicas of a distributed database, in an embodiment, are configured to generate local checksums to be used to verify the local ordering of operations associated to those replicas, and a checksum replica agent generates global checksums that can be used to verify the global ordering of operations associated with multiple replicas of the distributed system. The local checksums and the global checksums are stored in the shared log in at least one embodiment. In an embodiment, a replica retrieves a sequence of operations from the shared log and verifies all local checksums and all global checksums to ensure that the sequence of operations was received in order. In an embodiment, the local checksum can be utilized to ensure that all operations of a particular replica were received, and that the order in which the operations were received is correct. Likewise, the global checksum can be utilized to ensure that all operations associated with one or more replicas were received, and that the order in which the operations were received is correct. The replicas and/or the checksum replica agent, in an embodiment, are operated by a first organization and the shared log is operated by a second organization—techniques described herein can be utilized to provide cryptographically verifiable assurances that the second organization does not remove, re-order, or otherwise alter data that is contributed to the shared log, either due to malicious activity or as a result of an accident.

In an embodiment, a replica provides, to a shared log, local operations applied on the local replica and also provides a local checksum, which is information that is usable to determine a valid ordering of operations applied to a replica. In an embodiment, a local checksum provides cryptographically verifiable assurances as to the authenticity and integrity of local operations that are propagated from a replica to the shared log and ensures that the operations are received in order and cannot be modified either maliciously (e.g., by an adversary) or inadvertently (e.g., due to signal loss during transmission).

In an embodiment, a distributed database has multiple replicas that contribute local operations and local checksums to the shared log, where a shared log is a single logical structure that aggregates operations from across multiple replicas. The shared log in an embodiment, is utilized to aggregate operations from multiple sources (e.g., replicas may concurrently contribute changes to unrelated portions of a database), resolve conflicts, and/or for other purposes. Conflicts refer to various types of database conflicts, such as write-write conflicts, read-write conflicts (e.g., unrepeatable reads), and write-read conflicts (e.g., reading uncommitted data), or more generally, any type of conflict which would violate ACID properties (i.e., requirements of at least atomicity, consistency, isolation, and durability) of database operations.

In an embodiment, a checksum replica agent is implemented using software, hardware, or a combination thereof and is configured to generate a global checksum that is usable to determine a valid global ordering of operations applied to a distributed database by one or more replicas. In an embodiment, the checksum replica agent generates a global checksum by obtaining a sequence of database operations of a distributed database and local checksums, verifying the local ordering of the database operations using the local checksums, and in response to verifying the local orderings are valid, generating a digital signature based on the sequence of database operations that was received wherein the digital signature attests that the sequence is in the correct order.

In an embodiment, a client computer system obtains an ordered list of database operations from the shared log, such as by making a request via a replica of a distributed database. In an embodiment, the client computer system obtains one or more local checksums and one or more global checksums and performs a process to verify that the order of the database operations received is in the correct order by computing a checksum using at least the ordered list of database operations (e.g., by iteratively hashing values associated with the respective database operations in order) and comparing the calculated checksum with a global checksum, which are obtained as an entry in the shared log or are accessible via a request to a computing resource service provider. In an embodiment, the client computer system verifies the authenticity of a digital signature over the global checksum (e.g., to verify authenticity and integrity of the global checksum) prior to computing a checksum using the ordered list of database operations.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram 100 in which local and global checksums are utilized in connection with a distributed database to provide cryptographically verifiable assurances to the ordering of operations received from multiple contributors to the distributed database.

In an embodiment, a distributed database has multiple replicas such as the replicas 102A and 102B shown in FIG. 1 that can contribute changes to a shared log 106 and obtain changes made by other replicas to the shared log 106. A checksum replica agent 104 may be utilized to determine a global ordering of contributions made by multiple replicas and the global ordering can be verified by clients of the distributed database such as the client computing system 114 shown in FIG. 1.

In an embodiment, each replica of a distributed database is configured with the capability to write entries to the shared log 106 (e.g., a write operation to the distributed database made on a particular replica which is propagated to the shared log 106 so that other replicas may apply the same write operation to their local replicas of the state of the distributed database) and reading entries from the shared log 106 (e.g., other replicas may read the write operation from the shared log 106 and apply the write operation to their local replicas). For illustrative purposes, two replicas 102A and 102B are shown in FIG. 1, and there may in other cases be more replicas or fewer replicas of a distributed database.

In an embodiment, each replica (e.g., the replicas 102A and 102B illustrated in FIG. 1) retains a copy of at least part of the information maintained on the shared log 106. In this way, the shared log 106 and replicas 102A and 102B are implemented, respectively, in an embodiment, as a master database server and replica database servers. In an embodiment, the shared log 106 periodically replicates the information from the shared log 106 to each of the replicas. In an embodiment, replicas periodically request updates from the shared log to synchronize the replica's data with the shared log. In an embodiment, a replica includes a view onto the shared database that includes all operations applied up to a point in time T, such that the replica has access to all operations up to time T from the shared log 106 and applies those operations to obtain a database state that corresponds to the state of the shared log up to time T. In an embodiment, a replica receives requests to perform database operations, which are applied locally to the replica, and the local changes are provided to the shared log 106, which determines whether to accept the local changes. In an embodiment, a shared log 106 determines that a local change should not be accepted because the same data is concurrently modified by another replica and a conflict arises. In an embodiment, the shared log 106 determines that a local change was applied on data that was modified after the replica synchronized to the shared log, indicating the possibility of a stale read and/or an unserializable schedule. In an embodiment, a first replica (e.g., replica 102A) has a view onto the state of the distributed database that is different from the view of another replica—this may, for example, be due to the replicas synchronizing with the shared log at different times, local changes that are applied to a replica and not yet accepted by the shared log, and more.

Different databases store the data differently, in an embodiment, a database encrypts information retained in the database while another database does not, in an embodiment. Different databases may store data in accordance with different schemas. In an embodiment, databases store data using different data types and different data encodings. In an embodiment, a database may be used to store images, sound files, multi-media, or binary blocks of data. In an embodiment, copying data from one database to another includes conversion of the underlying data from one form to another.

In an embodiment, local operations 108A of a replica 102A refers to operations that are performed and/or recorded locally on the replica 102A, the operations 108A refer to all operations performed locally on the replica 102A or a subset that includes particular types of operations and/or excludes particular types of operations—for example, in an embodiment write-related database operations (e.g., those operations related to creating, updating, and deleting database records, modifying database configuration settings, creating, updating, and deleting database tables and/or indices, and more) are recorded; in an embodiment, database transaction operations (e.g., operations related to starting, committing, and aborting transactions) are recorded; in an embodiment, all operations except for read-related operations (e.g., operations that read a database record, query a view of a database table, and other types of operations that do not change the state of the database). Database operations, in an embodiment, are batched (e.g., several individual operations may be aggregated and applied as a group, which may improve efficiency, decrease battery usage, decrease memory usage, and more). In an embodiment, a client computer system is a client of a distributed database and issues requests to a replica to use the distributed database. In an embodiment, local operations 108A refer to log entries associated with the corresponding operations, and the log entries encode sufficient information to determine a corresponding database operation—for example, a log entry may include a command, an index of a table, column, and/or row, and a value to set. In an embodiment, operations such as the local operation 108A are encoded in a machine-readable format, such as in the form of a SQL (Structured Query Language) statement. In an embodiment, a replica can be provisioned at least in part by obtaining the log entries of the shared log 106, obtaining the first log entry (i.e., the oldest log entry), determining the database operation associated with the first log entry, applying the operation, and repeating the process sequentially (e.g., to the second oldest entry, third oldest entry, etc.) until all entries have been applied to the replica, thereby generating a replica with a view of the distributed database that matches the state indicated by the shared log 106 at a particular point in time.

In an embodiment, requests to perform database operations and/or the operations encoded in the request are digitally signed, thereby generating a digital signature—the digital signature is generated using a cryptographic key that is inaccessible to the shared log 106 and entities that host the shared log (e.g., a computing resource service provider) in cases where the shared log and the replicas are controlled by separate entities—for example, the shared log is hosted, in an embodiment, by a computing resource service provider of a first business organization and the replicas are hosted by computing devices of a second business organization that contracts with the first business organization for providing services related to computing resources. The cryptographic key used to generate the digital signatures, in an embodiment, is a symmetric cryptographic key (e.g., a secret key that is shared between the replicas 102A, 102B, and so on) or an asymmetric private key that has a corresponding asymmetric public key that can be utilized to verify authenticity of the digital signature. In an embodiment, digital signatures generated over the database operations are utilized to ensure the authenticity and integrity of data that is transmitted from a replica to the shared log and in turn to other replicas. Integrity refers to the data being unchanged from its original content (e.g., determining whether the data has been accidentally modified or deliberately tampered with) and authenticity refers to establishing the data's origin.

In an embodiment, a replica 102A provides, to the shared log 106, local operations 108A applied on the local replica 102A and also provides a local checksum 110A. In an embodiment, a local checksum 110A is information that is usable to determine a valid ordering of operations applied to a replica. For example, FIG. 1 illustrates a series of operations {A1, A2, A3} applied to the first replica 102A and the corresponding local checksum 110A includes information that attests that to that ordering in a manner that other replicas can verify the ordering. In an embodiment, a local checksum 110A provides cryptographically verifiable assurances as to the authenticity and integrity of local operations 108A that are propagated from a replica 102A to the shared log 106 and then to other replicas (e.g., the second replica 102B shown in FIG. 1) and ensures that the operations are received in order and cannot be modified either maliciously (e.g., by a malicious entity that intercepts the data) or inadvertently (e.g., due to signal loss during transmission). The local checksums may be implemented using techniques described elsewhere, such as in connection with FIGS. 4 and 8.

In an embodiment, a distributed database has multiple replicas such as the replicas 102A and 102B shown in FIG. 1 that contribute local operations 108A and 108B and local checksums 110A and 110B to the shared log 106. In an embodiment, a shared log 106 is a single logical structure that aggregates operations from across multiple replicas. The shared log 106 may be utilized for multiple purposes, such as to aggregate operations from multiple sources (e.g., replicas may concurrently contribute changes to unrelated portions of a database), resolve conflicts, and more. Conflicts refer to various types of database conflicts, such as write-write conflicts, read-write conflicts (e.g., unrepeatable reads), and write-read conflicts (e.g., reading uncommitted data), or more generally, any type of conflict which would violate ACID properties (i.e., requirements of at least atomicity, consistency, isolation, and durability) of database operations.

In an embodiment, a checksum replica agent 104 is software, hardware, or a combination thereof and includes executable code that, if executed by one or more processors, causes the one and more processors to generate a global checksum 112 that is usable to determine a valid global ordering of operations applied to a distributed database. In this context, a global ordering refers to the ordering of operations from multiple replicas that are received and recorded to the shared log 106. It should furthermore be noted that the ordering of operations between replicas may be different from the order in which the changes were applied at the local replicas—for example, a first operation is applied to a first replica at a first time and a second operation is applied to a second replica at a second time later than the first time, but a shared log receives the second operation from the second replica before the first operation from the first replica due to, for example, network conditions that cause additional latency/lag in the first replica transmitting information regarding the first operation to the shared log. Accordingly, timestamps recording the time of operation was applied to a local operation of a replica can, in some cases, be insufficient to determine the ordering of operations as between multiple replicas.

In an embodiment, a checksum replica agent 104 queries the shared log 106 for data and receives an ordered list of database operations attributable to multiple replicas and local checksums (e.g., the local checksums 110A and 110B shown in FIG. 1) for each of those replicas, verifies that the sub-ordering or local ordering of each replica using the replica's corresponding local checksum, and in response to verifying that the received ordering has a correct sub-ordering or local ordering for each replica, generates a global checksum 112 based on the ordered list that attests to the global order of operations. In this context, the terms "sub-ordering" and "local ordering" are used interchangeably and refer to the ordering of operations of a particular replica as presented by a shared log. For example, in FIG. 1, the shared log 106 receives, from the first replica, indications that operations A1, A2, and A3 were applied to the first replica and further receives a requests from the first replica to apply the operations in that order. In an embodiment, the shared log concurrently receives an indication that operations B1, B2, and B3 were applied to the second replica and a corresponding request to apply those operations. Continuing with the example, the indications from the first replica and the second operation may be received such that the global ordering of operations received by both operations at the shared log 106 is {A1, B1, B2, A2, B3, A3} (e.g., as shown by the ordered list 116 provided by the shared log 106 to a client computer system 114) and the "sub-ordering" or "local ordering" may refer to the order in which a particular replica's operations are presented, so the local ordering for operations attributable to Replica A is {A1, A2, A3} in the example discussed herein. A local checksum of a replica can be used to verify the ordering of the operations of that replica that the shared log 106 presents.

In an embodiment, the checksum replica agent 104 includes executable code that runs on a computer system and is a software application that is separate and distinct from the software application of the replicas. In some embodiments, each replica runs on a distinct computer system and the checksum replica agent 104 runs on another computer system separate from those that run the replica software. In an embodiment, the checksum replica agent 104 is a software application that runs on the same computer hardware as a replica (e.g., the checksum replica agent 104 and the replicas are software processes). In an embodiment, the checksum replica agent 104 is integrated into one or more replicas, such as in the form of an add-on to a software application.

In an embodiment, the checksum replica agent 104 generates a global checksum 112 by obtaining a sequence of database operations of a distributed database (e.g., a database where the database operations are attributable to multiple entities) and local checksums, verifying the local ordering of the database operations using the local checksums, and in response to verifying the local orderings are valid, generates a digital signature based on the sequence of database operations that was received wherein the digital signature attests that the sequence is in the correct order. The global checksum may be implemented in any suitable manner, such as by using techniques described in connection with generating local checksums, techniques described in connection with FIG. 6, and more.

In an embodiment, a shared log 106 is used to coordinate activity between replicas of a distributed system (e.g., database replicas of a distributed database). A shared log 106 may be implemented in any suitable manner, such as using software, hardware, or a combination thereof. In an embodiment, a shared log 106 includes one or more structured data objects that stores an ordered list of database operations that a set of replicas are able to interact with. In an embodiment, database replicas such as the replicas 102A and 102B shown in FIG. 1 contribute to the shared log 106 by appending database operations to the end of the shared log 106, thereby generating a rolling history of database operation which the shared log 106 can distribute to other replicas. An as example, a first replica provides a set of database operations to the shared log 106 (e.g., a set of write operations that are applied locally to the first replica and then uploaded to the shared log) and the set of database operations are appended to the end of the shared log 106 which may be ordered sequentially based on the order in which operations are received by the shared log 106. Continuing with the example, a second replica, issues a request (e.g., a transition request) to the shared log 106 to update the second replica's view of the database, and the shared log 106 provides (e.g., in response to a transition request) an ordered list of database operations from the last time that the second replica updated its local view (including the operations that the first replica contributed to the shared log 106), and the second replica applies the received changes in order to update its view of the state of the distributed database.

A shared log 106, in an embodiment, detects and resolves conflict sets between two or more replicas. In an embodiment, a database replica receives (e.g., from a client of a distributed database) one or more database operations (e.g., database write operations) associated with data of a database which may be identified using key values, and generates a conflict set. Generally, speaking, a conflict set includes a subset of the database (e.g., rows, indices, tables). It should be noted that in this context, the subset of the database may include some or all of the database, or may even refer to an empty set (i.e., the operation generates no conflicts), and, as noted below, the term "subset" does not necessarily denote a proper subset of the corresponding set, but the subset and the corresponding set may be equal. Continuing with the example, the replica offers the database operation, the conflict set, and a sequence number corresponding to the last request that had been locally applied to the replica, and the shared log 106 determines whether a conflict exists by, for example, querying in sequence some or all operations appended to the shared log 106 after the sequence number of the last request locally applied to the replica to determine whether a conflict exists. In general, rules for determining whether a conflict exists can be defined in any manner—for example, in accordance with an example set of conflict rules, a conflict exists where the operations being offered are not serializable due to a write-write database conflict. A conflict may be defined based on database principles such as ACID and concurrency control. In an embodiment, a conflict exists if there is no serializable schedule of a set of operations. If a conflict exists, the shared log 106 rejects the operations offered by the replica and indicates a conflict; if no conflict exists, the operations are accepted and appended to the shared log 106 so as to be accessible by other replicas. This process may be repeated for writes from any other replica. For example, another replica receives the operations appended to the end of the shared log 106 and performs those operations in sequence against the local view of the distributed database.

In an embodiment, a client computer system 114 obtains an ordered list of database operations 116 from the shared log 106, such as by making a request via a replica (not shown in FIG. 1) of a distributed database. The client computer system 114 may be any suitable computing entity. In an embodiment, the client computer system obtains one or more local checksums and one or more global checksums. In an embodiment, the client computer system 114 performs a process to verify that the order of the database operations received is in the correct order by calculating a checksum verification value using at least the ordered list of database operations 116 (e.g., by iteratively hashing values associated with the respective database operations in order) and comparing the calculated checksum 118 with a global checksum 112, which are obtained as an entry in the shared log or are accessible via a request to a computing resource service provider. In an embodiment, the client computer system 114 verifies the authenticity of a digital signature over the global checksum 112 (e.g., to verify authenticity and integrity of the global checksum).

In an embodiment, FIG. 1 illustrates a distributed system in which replicas are embedded computing devices that include various sensors and actuators that gather data and perform various tasks. For example, an embedded computing device is configured to gather video and/or audio data of an entrance to a residence and stream the content to a mobile computing device over a wireless network and can unlock the door to the residence upon receiving instructions from the mobile computing device (e.g., via a mobile application). Generally speaking, embedded devices can be configured to gather any suitable type of data using various types of sensors, including temperature sensors, movement sensors, location sensors (e.g., global positioning system (GPS) sensors), sensors for monitoring and recording network traffic across an intranet or Internet connection, and more. Generally speaking, embedded devices can be configured with various types of actuators, such as those that open and close doors, control other devices such as household appliances, control other embedded computing devices, and more. In an embodiment, the system illustrated in FIG. 1 includes a set of devices communicating over a network (e.g., a 802.11 compliant Wi-Fi network) as an Internet of Things (IoT) network.

In an embodiment, FIG. 1 illustrates an IoT system in which replicas (e.g., the replicas 102A and 102B illustrated in FIG. 1) are embedded computing devices that capture sensor data (e.g., data 108A and 108B illustrated in FIG. 1) recorded over a period of time and generate local checksums (e.g., local checksums 110A and 110B illustrated in FIG. 1) which are recorded in a shared log 106 which is any suitable data storage system such as a hard disk drive attached to a server that shares a connection (e.g., Wi-Fi connection) with the replicas. In an embodiment, the checksum replica agent is a computer system such as a server that verifies the ordering of sensor data is in a correct sequence and generates global checksums attesting to the correctness of the ordering of the sensor data in the shared log, thereby ensuring the integrity of the global ordering of sensor data. In an embodiment, the client computer system 114 is a replica (e.g., the contents of the shared log are shared with the sensors) or a control server that receives sensor data, analyzes the sensor data, and provides various instructions to embedded computing devices. Thus, by providing cryptographically verifiable assurances as to the integrity of the ordering of the sensor data received from the shared log 106, the system is made resilient against various types of attacks in which a malicious party attempts to re-order sensor data to cause the system to drive actuation of various systems, such as unlocking the entrance to a residence or business.

In an embodiment, FIG. 1 illustrates a system in which the shared log 106 is used to capture security audit streams such as security audio logs from various systems. In an embodiment, the replicas are any suitable computing device that contributes data to the shared log, and the client computer system 114 is any suitable computing device that performs security incident analysis. Thus, the global checksums can be used by the client computer system 114 to verify that attacks to the system are not hidden, either maliciously (e.g., due to the system being compromised by a virus or malware) or inadvertently (e.g., due to a programming bug).

Figure 2:
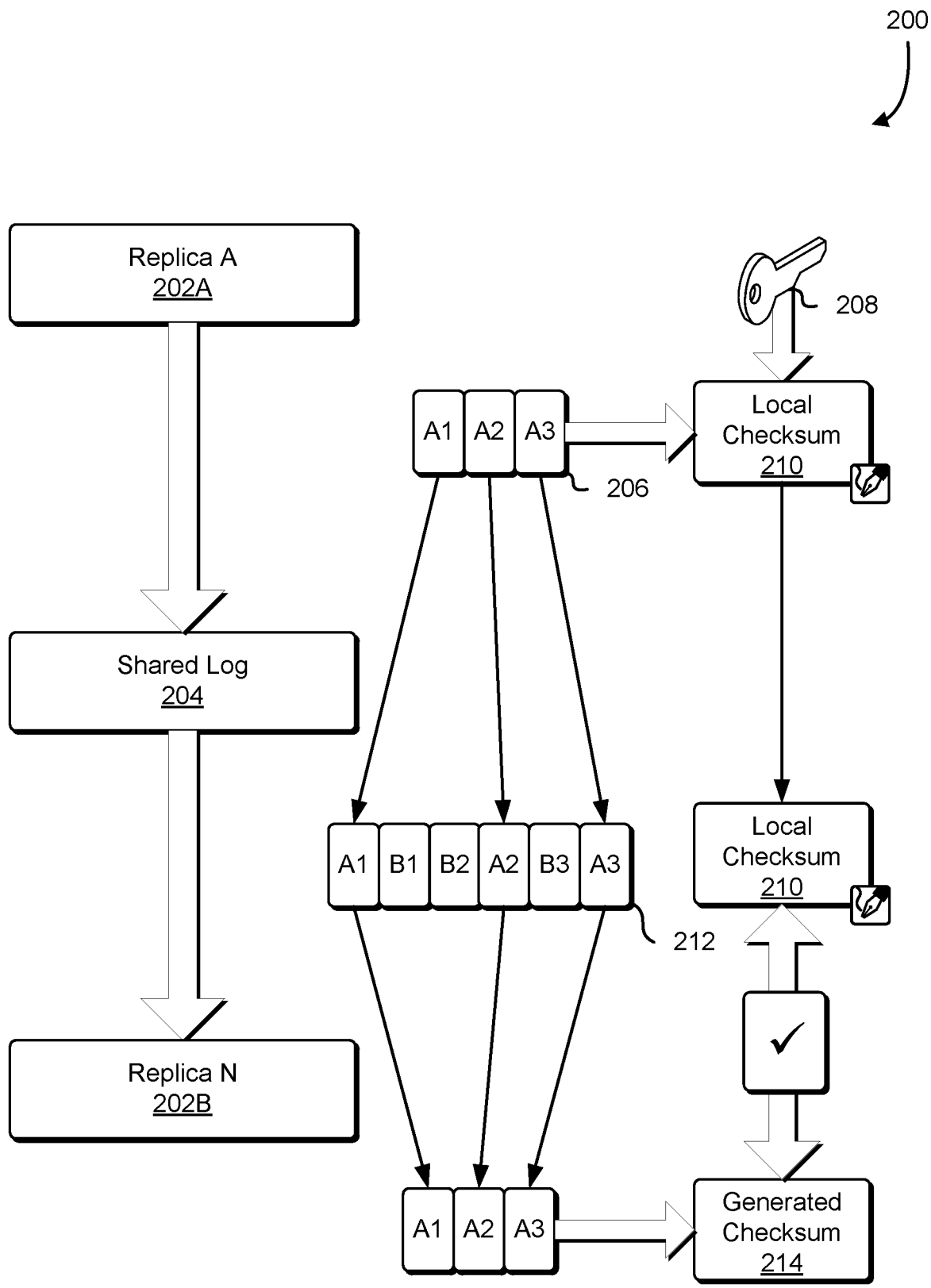
FIG. 2 illustrates a system for verifying a correct ordering of operations received by a replica of a distributed system.

In an embodiment, FIG. 2 illustrates a diagram 200 in which a local checksum 210 is generated by a replica, propagated to a shared log, and verified by another replica. In an embodiment, a first replica 202A performs a series of database operations and generates log entries 206 corresponding to the database operations (e.g., database write operations) in an order. In an embodiment, the log entries 206 include information that is usable to determine the corresponding database operation or command that was performed, such as a SQL statement. For illustrative purposes, FIG. 2 shows a series of three operations A1, A2, and A3 that are performed in order. In an embodiment, the first replica 202A generates a local checksum 210 from the log entry 206 corresponding to the series of database operations, which involves computing an iterative hash over the database operations in order—for example, by determining a value V1 associated with A1, hashing that value to generate a first hash value H1 (not shown in FIG. 2), determining a value V2 associated with A2, hashing the sum of H1 and V2 to generate a second hash value H2, determining a value V3 associated with A3, hashing the sum of H2 and V3 to generate a third hash value H3, and then generating a digital signature over H3 (the result of iteratively hashing A1 thru A3) using at least a cryptographic key 208. In an embodiment, the cryptographic key 208 is a symmetric cryptographic key that each replica (e.g., the replicas 202A and 202B shown in FIG. 2) has access to. In an embodiment, the cryptographic key 208 is a private key having a corresponding public key in accordance with an asymmetric key cryptography algorithm wherein the corresponding public key is usable to verify the digital signature.

In an embodiment, a replica 202A performs write operations on the local replica of a distributed database, generates a local checksum 210 from log entries 206 associated with the write operations, digitally signs the local checksum 210, and propagate the log entries 206 associated with the write operations to a shared log 204, thereby making the operations available to other replicas. The local checksum 210 may also be made available to the shared log 204. In an embodiment, the local checksum 210 is generated by iteratively hashing the log entries 206 associated with the local database operations, such as in the manner described elsewhere in connection with FIGS. 1, 4, and/or 8. In an embodiment, the local checksum 210 is digitally signed using a symmetric secret key that is accessible by the replicas of the distributed database and is not accessible to a computing resource service provider that hosts the shared log 204.

In an embodiment, a second replica 202B receive log entries 212 corresponding to a series of operations and one or more local checksums 210 from the shared log 204 and verifies the local ordering of operations received using the local checksum 210. In an embodiment, a second replica 202B receives log entries 212 associated with a sequence of database operations from a shared log 204 where the sequence includes log entries associated with operations that are attributable to multiple replicas—for example, operations A1, A2, and A3 are writes made locally by the first replica 202A (and then propagated to the shared log 204), whereas operations B1, B2, and B3 are made locally at another replica (and then propagated to the shared log 204). The shared log 204 may provide information that attributes operations to a replica—for example, the operations themselves may include metadata that indicates an identifier associated with the replica where the operation was first applied, the replicas may be encoded in an associated data structure (e.g., a vector or an array), and more.

In an embodiment, the second replica 202B receives log entries 212 associated with an ordered sequence of operations (e.g., the ordering is the ordering in which the operations are received or there are indices, ordinals, or other ordering information that is also provided) and the log entries 212 are parsed to obtain an ordered subsequence of operations that are attributable to the first replica 202A, the subsequence is used to generate a checksum 214 that is used as a verification value, and the value of the generated checksum is compared against the local checksum 210 received to determine if they match (e.g., if they have the same value). In an embodiment, the local checksum is digitally signed, and verification of the digital signature is performed by the second replica 202B or by a service on behalf of the second replica 202B (e.g., in response to a request).

Figure 3:
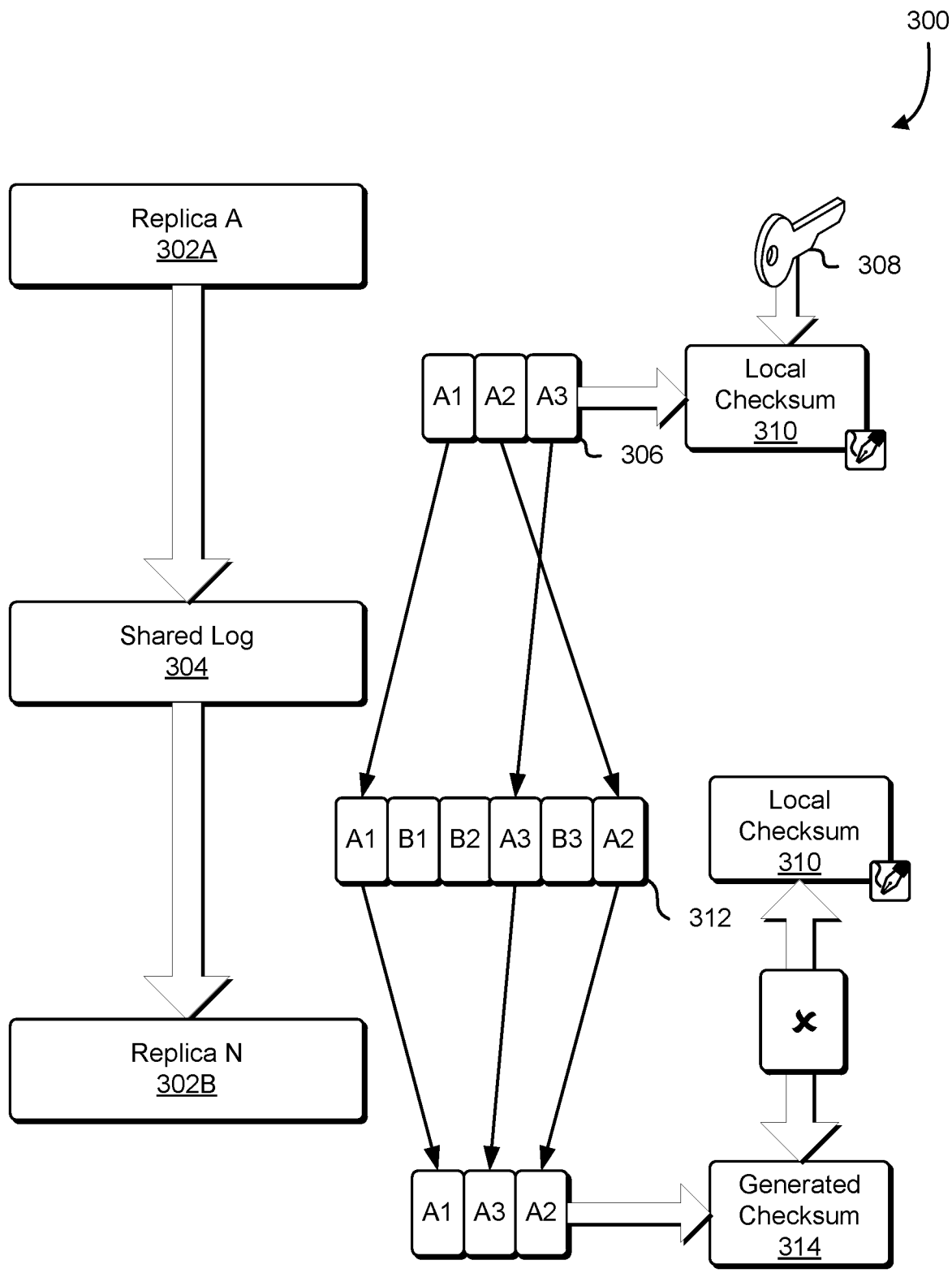
FIG. 3 illustrates a system for detecting an ordering of operations received by a replica of a distributed system is in an incorrect order.

In an embodiment, FIG. 3 illustrates a diagram 300 in which a local checksum is utilized to detect that the sequence of operations received from a shared log 304 is out of order. In an embodiment, the first replica 302A, the shared log 304, and the second replica 302B can be implemented in accordance with embodiments described in connection with FIG. 2. In an embodiment, a replica 302A of a distributed database performs a set of operations A1, A2, and A3 locally which is performed individually (e.g., the operations are performed independently from each other and transmitted separately from each other). A local checksum 310, in an embodiment, is generated based on the log entries 306 associated with a set of operations by iteratively hashing the log entries associated with the operations in sequential order (e.g., based on the order that the operations were applied on the local replica of a distributed database) to generate a local checksum 310. Furthermore, in an embodiment, the local checksum 310 is digitally signed using a cryptographic key 308 that is accessible to the replica 302A (e.g., via a cryptography service). In an embodiment, the digital signature is verifiable by another replica (e.g., the second replica 302B shown in FIG. 3). In an embodiment, the digital signature is verified by a service (e.g., an authentication service of a computing resource service provider) that is separate from the replicas of the distributed database that is accessible by the replicas, clients of the replicas, and/or other computing entities.

In an embodiment, a first replica 302A performs a set of operations and generates log entries 306 corresponding to the set of operations on a local replica of a distributed database and provides the log entries 306 for the set of operations to the shared log 304 where the operations are recorded to a shared log, thereby making the log entries associated with the operations available to other replicas. In an embodiment, the log entries are encoded in a machine-readable format, such as in the form of SQL statements. The local checksum 310, in an embodiment, is transmitted to and recorded in the shared log 304.

In an embodiment, the shared log 304 receives the log entries 306 corresponding to the set of operations that are ordered temporally (e.g., based on timestamp information encoded in the operations)—for example: {A1, A2, A3}. In an embodiment, the shared log 304 receives log entries for additional operations from another replica (not shown in FIG. 3) and generates a global ordering of operations for two or more replicas. In an embodiment, the global ordering of operations 312 generated by the shared log 304 is incorrect—for example, the global ordering of the operations 312 that is generated by the shared log may be {A1, B1, B2, A3, B3, A2} is incorrect because the first replica 302A generated the operations in the order {A1, A2, A3} and the global ordering has A3 occurring before A2. In an embodiment, the global ordering refers to a sequence of log entries associated with database operations from two more replicas (e.g., operations that were originally applied to different replicas and then accepted by the shared log).

In an embodiment, the local checksum 310 is usable to verify whether a local ordering is correct. In an embodiment, a suitable computing entity such as another replica (e.g., the replica 302B shown in FIG. 3), a client of the distributed database that uses a replica, an authentication service of a computing resource service provider, etc., receives log entries corresponding to a global ordering of operations 312 from the shared log 304 and a local checksum 310 associated with the first replica 302A, parses the log entries corresponding to the global ordering of operations 312 to determine the ordering of the operations associated with the first replica, generates a checksum 314 (e.g., a checksum verification value) based on the received local ordering (e.g., by iteratively hashing the log entries associated with the database operations attributed to the first replica), and compares the value of the generated checksum 314 with the value of the received local checksum 310. In an embodiment, the entity (e.g., the replica 302B shown in FIG. 3) also verifies authenticity of a digital signature associated with the local checksum 310, and only generates the checksum 314 after verifying that the digital signature generated over the local checksum is authentic. In FIG. 3, the ordering of the operations performed locally on the first replica 302A may have been propagated (e.g., as log entries encoding the operations) in an incorrect order to the second replica 302B for various reasons—malicious actors may re-order the operations, the ordering may have been inadvertently changed (e.g., due to a bug in computer code), the ordering may have been received out of order, and so on—nevertheless, the local checksum 310 can be utilized to verify the local ordering and the digital signature associated with the local checksum 310 can provide cryptographically verifiable assurances of authenticity and integrity of the local checksum data.

Figure 4:
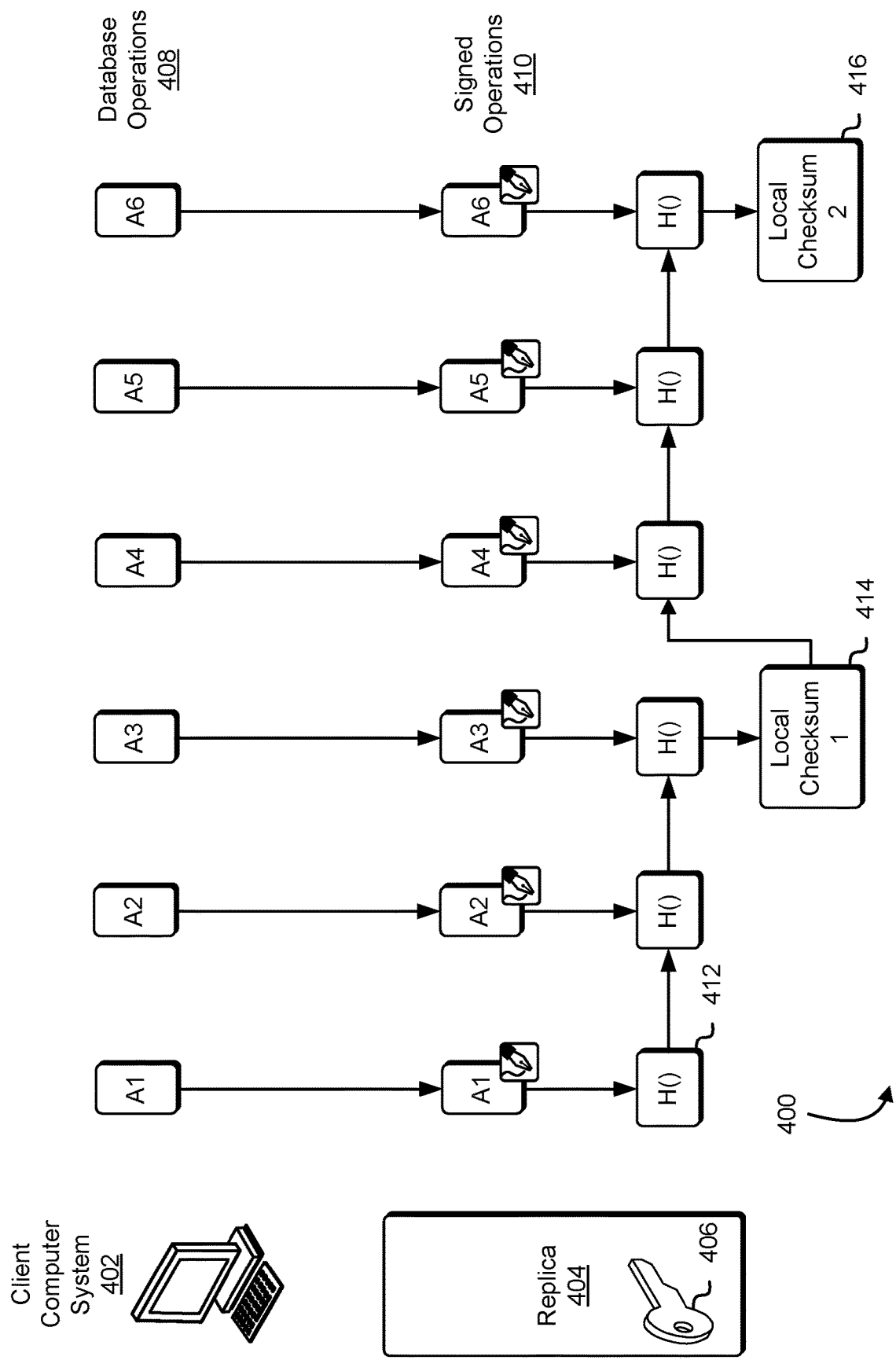
FIG. 4 illustrates a system for generating local checksums.

In an embodiment, FIG. 4 illustrates a diagram 400 in which a replica generates local checksums. In an embodiment, a client computer system 402 interacts with a replica 404 to generate local checksums such as the local checksums 414 and 416 shown in FIG. 4. In an embodiment, a client computer system 402 is any suitable computing entity that interfaces with a replica 404, such as a client of a distributed database. In an embodiment, the client computer system 402 hosts a client as a first process that issues requests to a replica, which is hosted as a second process on the same computer system, wherein the first process and the second process communicate via any suitable form of inter-process communication, such as a remote procedure call (RPC) interface.

In an embodiment, the replica 404 illustrated in FIG. 4 is in accordance with replicas described elsewhere, such as in connection with FIG. 1, and is software, hardware, or a combination thereof. In an embodiment, the replica 404 is a software application that includes executable code that, if executed by one or more processors, causes the one or more processors to generate local checksums. In an embodiment, the replica 404 has access to a cryptographic key that is usable to generate digital signatures and/or encryption data such database operations performed on the replica 404 (e.g., in response to a request from the client computer system 402), metadata associated with the database operations, and more. In an embodiment, the replica 404 is a view on the contents of a distributed database that is generated based at least in part on a shared log, such as those described elsewhere in connection with FIG. 1.

In an embodiment, the cryptographic key 406 is accessible to the replica via a cryptographic module such as a hardware security module (HSM) or trusted platform module (TPM) that securely stores the cryptographic key—secure storage in this context may refer to the cryptographic keys being programmatically unexportable from the cryptographic module. In an embodiment, the replica 404 utilizes one or more application programming interface (API) requests to perform various cryptographic operations (e.g., encrypt data, decrypt data, digitally sign data, verify digital signature) that use the cryptographic key 406. In an embodiment, the replica 404 makes a web API request to a security service of a computing resource service provider that securely stores cryptographic keys for multiple clients of the computing resource service provider and grants access to fulfill various requests to perform cryptographic operations using the cryptographic key 406 after performing an authentication process that determines the identity of the replica 404 and an authorization process that determines that the replica 404 is authorized to access and use the cryptographic key 406 in accordance with the request.

The cryptographic key 406, in an embodiment, is a symmetric cryptographic key usable in accordance with at least one symmetric-key algorithm such that the cryptographic key 406 is usable to both encrypt a plaintext to generate a ciphertext and decrypt the ciphertext to retrieve the plaintext. In an embodiment, the cryptographic key 406 is usable to generate a digital signature over data and verify the authenticity of a purported digital signature of the data. In an embodiment, the cryptographic key 406 is a shared secret that is accessible to some of the replicas of a distributed database. In an embodiment, the cryptographic key 406 is a shared secret that is accessible to all of the replicas of a distributed database that are initialized and in a steady state (e.g., as part of provisioning a new replica, the shared secret is distributed to the new replica as part of an initialization or setup phase). In an embodiment, the cryptographic key 406 is a shared secret between the replica 404 and one or more checksum replica agents such as those described elsewhere in connection with FIG. 1.

The cryptographic key 406, in an embodiment, is an asymmetric cryptographic key usable in accordance with at least one asymmetric-key algorithm such as the Advanced Encryption Standard (AES). In an embodiment, the cryptographic key 406 is an asymmetric private key having a corresponding asymmetric public key that form a public-private key pair. In an embodiment, the cryptographic key 406 is an asymmetric private key that is shared between the replicas of a distributed database and used by the replicas to generate digital signatures over and/or encrypt data. In an embodiment, one or more checksum replica agents (such as those described in connection with FIG. 1) have access to a public key that is usable to decrypt and/or verify digital signatures generated by the cryptographic key 406 which is a private key corresponding to the public key. In an embodiment, each replica has a respective private key that the replica uses to digitally sign and/or encrypt data (e.g., database operations) that is appended to a shared log by the respective replica. In an embodiment, replicas of a distributed database share a private key that is used to digitally sign and/or encrypt data (e.g., database operations) that is appended to a shared log by the replicas. In an embodiment, the cryptographic key 406 is not made accessible to a shared log of a distributed database.

In an embodiment, a replica 404 receives requests to perform database operations from a client computer system 402, wherein the operations A1, A2, A3, etc., illustrated in FIG. 4 correspond to individual and/or batched operations. In an embodiment, the replica 404 generates corresponding log entries for at least some of the database operations 408 (e.g., only write operations are logged; read operations are not logged; and combinations thereof). In an embodiment, a replica 404 receives a request to perform a database operation, performs the database operation locally, and generates a digital signature from a log entry associated with the database operation. In an embodiment, the replica 404 digitally signs and encrypts the database operation or data associated with the database operation using an authenticated encryption algorithm such as encrypt-then-MAC, encrypt-and-MAC, MAC-and-encrypt, and more. In an embodiment, the replica 404 provides the signed operations 410 (e.g., a digital signature over a log entry associated with the operation) to a shared log, wherein the digitally signed operations 410 correspond to the database operations performed locally against the replica 404 and the digital signatures are cryptographically verifiable by at least a checksum replica agent or on behalf of a checksum replica agent.

In an embodiment, a hash function 412 (e.g., a cryptographic hash function) is used to generate a hash output based at least in part on the database operations. Generally speaking, the hash function 412 may be a one-way function wherein an entity with output of the function but without access to the corresponding input is unable to determine the input without, for instance, extraordinary expenditure of computational resources necessary for a cryptographic (e.g., brute force) attack. In an embodiment, a one-way function is utilized in place of hash functions.

In an embodiment, local checksums are generated by replicas using hash functions. As an example, FIG. 4 illustrates, in an embodiment, generating a first local checksum 414 in the following manner: a hash value is initialized to a starting value (e.g., initialized to a predetermined value such as zero) and a hash function generates an output H1 from inputs that are based on a first database operation A1 and a counter—in an example, the inputs is a payload comprising the log entry associated with the first database operation A1 (e.g., a SQL statement) and the counter is an incrementing value that is initialized to 1. The input, in an embodiment, is a concatenation of the counter and the payload. In an embodiment, the hash function accepts the input comprising the payload and the counter and generates a first hash output value. Continuing with the example, a hash function generates a second output H2 from the second payload associated with A2 and the counter, which has been incremented, and the value of the first hash output and the second hash output are summed together, and the process may be repeated again for a third payload associated with A3. In an embodiment, a local checksum 414 is generated from the hash output. In an embodiment, the local checksum 414 is the summation of the hash outputs H1, H2, etc., as described above. In an embodiment, the local checksum 414 is an iterative hash such that the input to a hash function is based at least in part on a previous hash output—for example, a first hash value H1 is generated using an input based on a genesis value (e.g., zero) concatenated with the first database operation A1, and the second hash output H2 is generated using a second input based on the first hash output H1 concatenated with the log entry associated with the second database operation A2. It should be noted that the above are illustrative examples of techniques for generating local checksums and hashing data, and that other variations of these techniques are also contemplated within the scope of this disclosure. The first local checksum 414 may be digitally signed (e.g., using the cryptographic key 406 in the same or similar manner as described in connection with the database operations) and appended to a shared log.

In an embodiment, a local checksum is generated periodically, which can be based on a time period (e.g., a checksum is generated based on a timed schedule), a number of operations (e.g., a checksum is generated every N operations), a combination thereof, and/or based on other criteria. In an embodiment, the first local checksum 414 is digitally signed and provided to the shared log as an attestation of the local ordering of operations performed by the replica. In an embodiment, the first local checksum 414 is also provided as an input to subsequent hash operations so that, for example, the hash value H4 is generated using an input based on the first local checksum 414 and a log entry associated with the fourth database operation A4, and so on, to generate a second local checksum 416 using techniques described above in connection with generating the first local checksum 414. In an embodiment, the second local checksum 416 is derivable from the previous local checksum (i.e., the first local checksum 414 shown in FIG. 4) and database operations (e.g., log entries associated with database operations) subsequent to the previous local checksum.

In an embodiment, a replica 404 generates a placeholder checksum when no activity has been detected after a predetermined period of time where the placeholder checksum is generated by generating a hash of a placeholder operation indicating that there has been no database operations logged or that no database operations have been logged in a particular time range. In an embodiment, a placeholder operation is encoded in association with a counter and a digital signature is generated over the placeholder operation and counter that attests to the placeholder operation being associated with the counter value, and the counter is incremented after the digital signature is generated over the placeholder operation and/or placeholder checksum. In an embodiment, the placeholder checksum is generated on a periodic basis if no activity has been recorded for a particular replica (e.g., if a replica has not performed any write operations within the period) and is referred to as a heartbeat checksum. In an embodiment, a system such as a checksum replica agent is configured with executable code that, if executed on one or more processors, causes the one or more processors to receive a sequence of operations from a shared log, determine that each replica of a distributed system (e.g., each database replica of a distributed database) has provided a local checksum which can be a heartbeat checksum.

Figure 5:
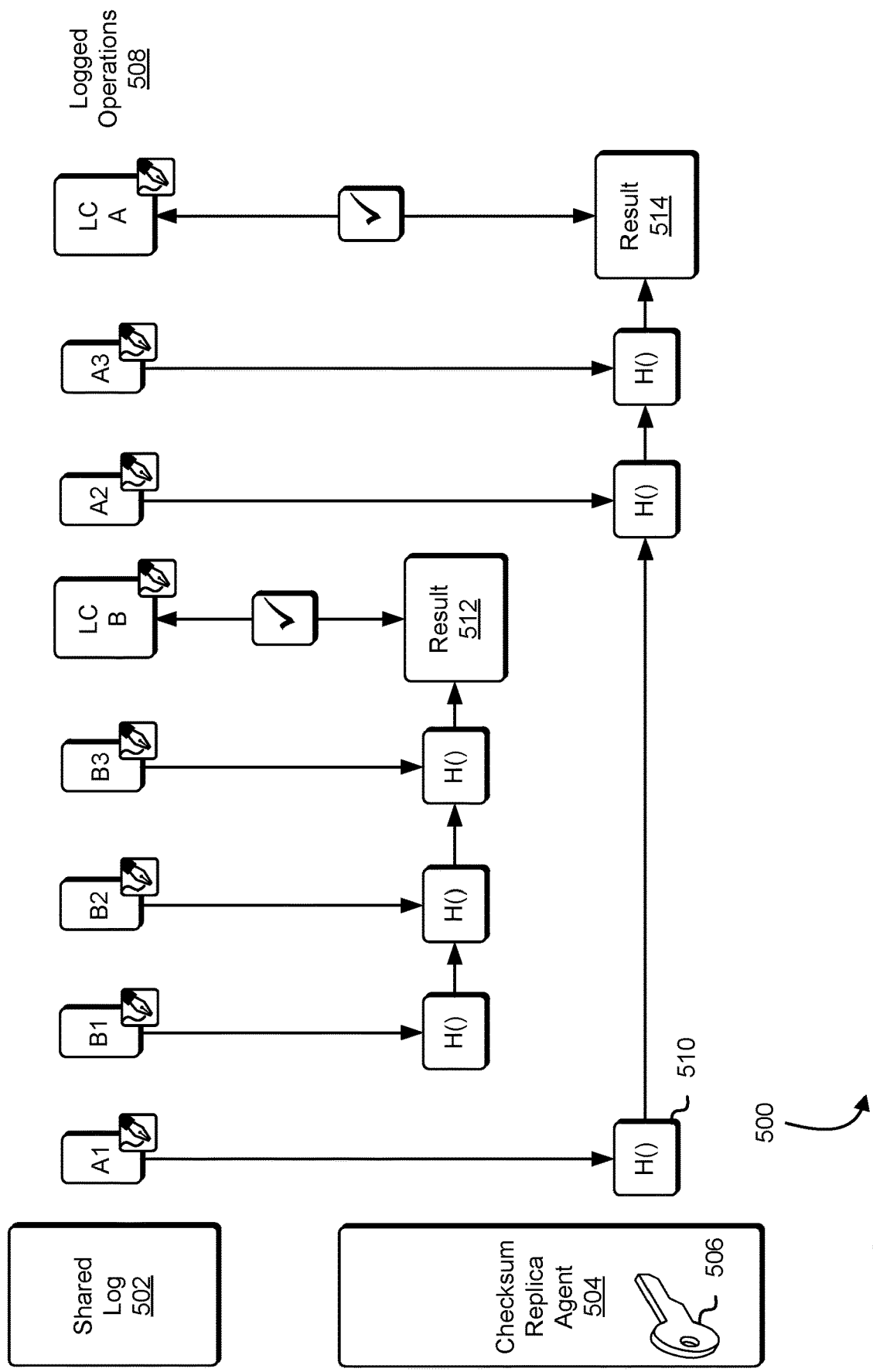
FIG. 5 illustrates a system for using local checksums to verify an ordering of operations.

In an embodiment, FIG. 5 illustrates a diagram 500 in which a checksum replica agent 504 verifies the local ordering of operations received from a shared log 502. In an embodiment, the shared log 502 is a shared log of a distributed database and is hardware, software, or a combination thereof in accordance with shared logs described elsewhere such as those described in connection with FIG. 1. In an embodiment, the checksum replica agent 504 is hardware, software, or a combination thereof in accordance with those described in connection with FIG. 1. In an embodiment, the checksum replica agent 504 has access to a cryptographic key 506 that is usable to verify digital signatures and/or decrypt data of the shared log 502. In an embodiment, the cryptographic key 506 is an asymmetric public key used to verify digital signatures generated over database operations and local checksums using a corresponding asymmetric private key that one or more database replicas have access to. In an embodiment, the asymmetric private key is not made accessible to the shared log 502 and/or entities hosting the shared log 502.

In an embodiment, a checksum replica agent 504 is a service of a computing resource service provider that includes executable code that, if executed by one or more processors, verifies the local ordering of operations received by a shared log. It should be noted that the checksum replica agent 504, in an embodiment, performs additional tasks such as generating one or more attestations of global orderings that are cryptographically verifiable by other entities. In an embodiment, a checksum replica agent 504 periodically (e.g., based on time or number of operations) obtains operations from the shared log 502. In an embodiment, the shared log 502 provides (e.g., in response to a transition request) an ordered list of database operations 508 and/or local checksums wherein at least some of the operations and checksums are digitally signed.

In an embodiment, the checksum replica agent 504 verifies the local ordering of multiple replicas (e.g., a first replica appended log entries A1, A2, A3, and local checksum A ("LC A" in FIG. 5) to the shared log and a second replica appended log entries B1, B2, B3, and local checksum B ("LC B" in FIG. 5) to the shared log). The checksum replica agent 504 may receive the operations and checksums, determine which replica the operation or checksum is associated with (e.g., such information may be encoded within the operation and/or checksum), and determine a subsequence of the logged operations 508 that is associated with a particular replica. For example, as illustrated in FIG. 5, the checksum replica agent 504 receives a first log entry for a first operation A1 associated with a first replica (e.g., replica "A"), verifies the digital signature over the log entry for operation A1 is authentic using the cryptographic key 506, and generates a hash output using a hash function 510. In an embodiment, a one-way function is, generally, utilized where hash functions are referenced. The checksum replica agent 504 determines that the next log entry for the next operation that is associated with the first replica is the log entry for operation A2, verifies the digital signature over the log entry for A2, and generates a hash output based on the previous hash output and log entry for operation A2. This process may be repeated until a log entry for a local checksum is detected, at which point the result 514 generated by the hash outputs of the checksum replica agent 504 are compared against the local checksum value to check that the values match (as indicated by the checkmark shown in FIG. 5). In an embodiment, the checksum replica agent verifies a digital signature over the local checksum. Likewise, continuing with the example above, the checksum replica agent 504 receives a log entry for a first operation B1 associated with a second replica (e.g., replica "B"), verifies the digital signature over the log entry for B1 is authentic, and generates a hash output that is used as an input to the hash function 510 of the log entry for the next operation B2 of the second replica. This process is repeated until a log entry of a local checksum for replica B is detected, and the generated result 512 for replica B is compared against the local checksum obtained from the shared log. If local checksum has a valid digital signature and the values of the local checksum B and the generated result 512 match, then the checksum replica agent 504 determines that the local ordering for operations associated with replica B are in order. In an embodiment, the checksum replica agent 504 receives the logged entries for the operations 508 from a client of a distributed database rather than from the shared log 502. In an embodiment, the result is usable as a checksum verification value to determine whether the value of a local checksum from the logged operations matches the generated result value.

In an embodiment, the checksum replica agent 504 stores (e.g., in memory) or has access to (e.g., via a network storage device) to a list of replicas and has executable code that, as a result of being executed by one or more processors, causes the one or more processors to verify that a local checksum was received from each replica of the list. In an embodiment, the replicas are configured to send a heartbeat checksum on a periodic basis if no activity occurs within a predetermined period of time and the checksum replica agent 504 is configured to verify that a signed heartbeat checksum or heartbeat operation is received if the predetermined period lapses, thereby ensuring that it is not possible for all operations and checksums from a particular replica to be dropped or hidden from the checksum replica agent 504 without being detected.

Figure 6:
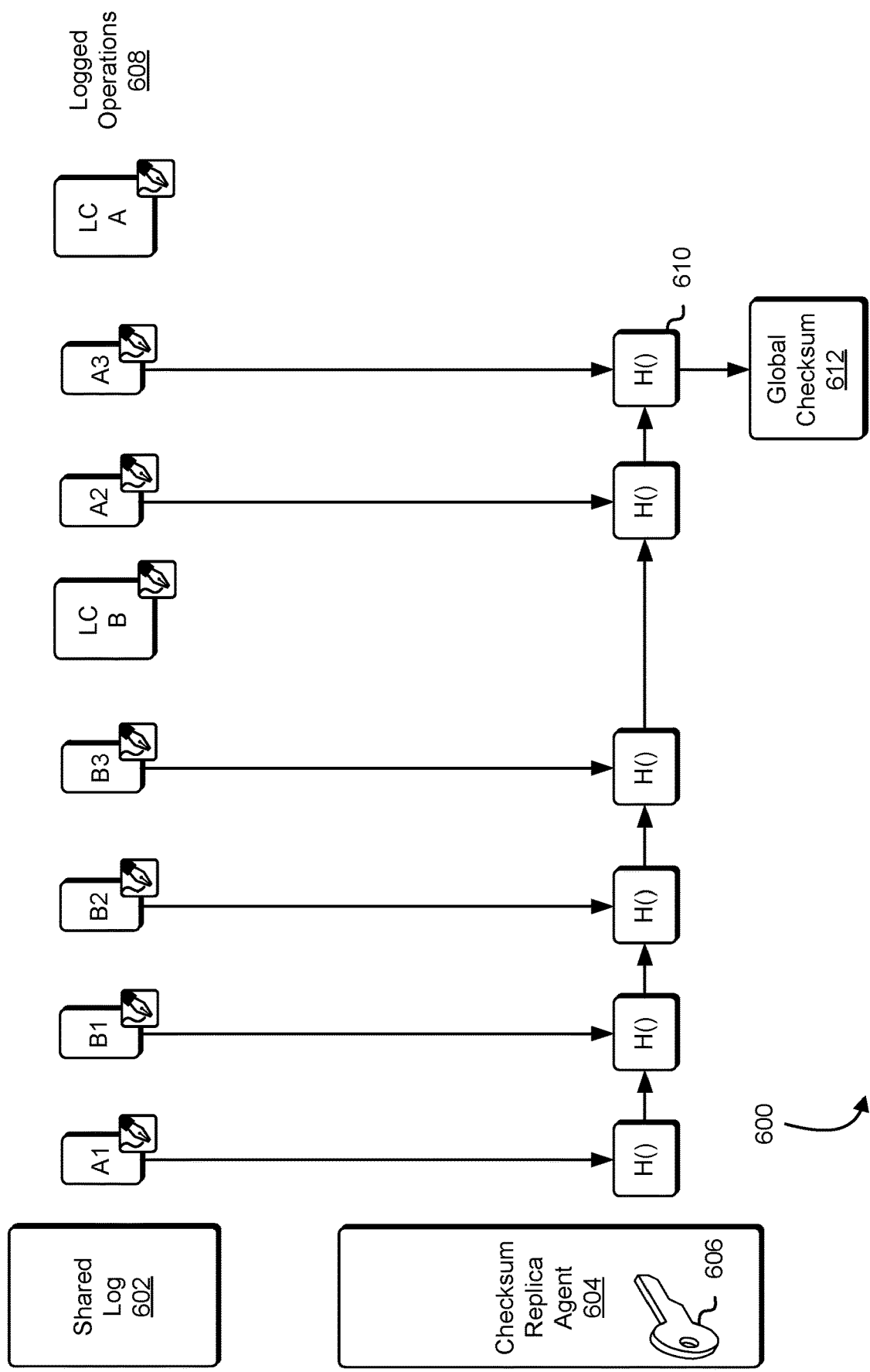
FIG. 6 illustrates a system for generating global checksums.

In an embodiment, FIG. 6 illustrates a diagram 600 in which a system generates a global ordering based on operations received from a shared log. In an embodiment, the checksum replica agent 604 shown in FIG. 6 is software, hardware, or a combination thereof that includes executable code that, if executed by one or more processors, causes the one or more processors to generate a global ordering based on operations received from a shared log 602. In an embodiment, the shared log 602 is a shared log of a distributed database and is hardware, software, or a combination thereof and implemented in accordance with shared logs described elsewhere, such as those described in connection with FIG. 1. In an embodiment, the checksum replica agent 604 includes executable code that, if executed on one or more processors, causes the one or more processors to access a cryptographic key 606 that is usable to generate digital signatures and/or encrypt data such as the global checksum 612 illustrated in FIG. 6. In an embodiment, the cryptographic key 606 is a different key from those utilized in connection with generating and verifying digital signatures of local checksums, such as those described in connection with FIGS. 4-5. In an embodiment, the cryptographic key 606 is a symmetric key that is a shared secret accessible to the replicas and the checksum replica agent 604 and utilized to encrypt and decrypt data and/or generate and verify digital signatures generated by the replicas and the checksum replica agent (e.g., digital signatures over local and global checksums).

In an embodiment, the checksum replica agent 604 receives logged operations 608 for operations from a shared log 602 which includes log entries associated with database operations and local checksums. In an embodiment, the checksum replica agent 604 includes executable code that, if executed on one or more processors, causes the one or more processors to verify the local ordering of the logged operations, such as in the manner described elsewhere in connection with FIG. 5. In an embodiment, the checksum replica agent 604 generates a global checksum in response to determining local ordering for the replicas are correct, wherein the determination is made by at least computing an output result from the logged operations and comparing the generated output with a local checksum that was provided. The global checksum 612 is, in an embodiment, generated in accordance with techniques described above in connection with generating local checksums (e.g., in connection with FIG. 4), wherein the global checksum is generated using hash inputs to a hash function 610 that is associated with multiple entities—for example, the global checksum 612 shown in FIG. 6 is generated from log entries for operations associated with a first replica (e.g., replica "A") and a second replica (e.g., replica "B") and possibly more replicas in some cases. In an embodiment, the local checksums are also hashed in sequence with the log entries for the database operations shown in FIG. 6. In an embodiment, the global checksum 612 is digitally signed using a cryptographic key 606 and authenticity of the digital signature is cryptographically verifiable using a corresponding public key accessible to various entities such as clients of a distributed database, replicas, the shared log, and more. In an embodiment, the global checksum 612 is digitally signed and appended to the shared log 602 and is associated with the checksum replica agent 604. In an embodiment, a one-way function may, generally, be utilized where hash functions are referenced.

Figure 7:
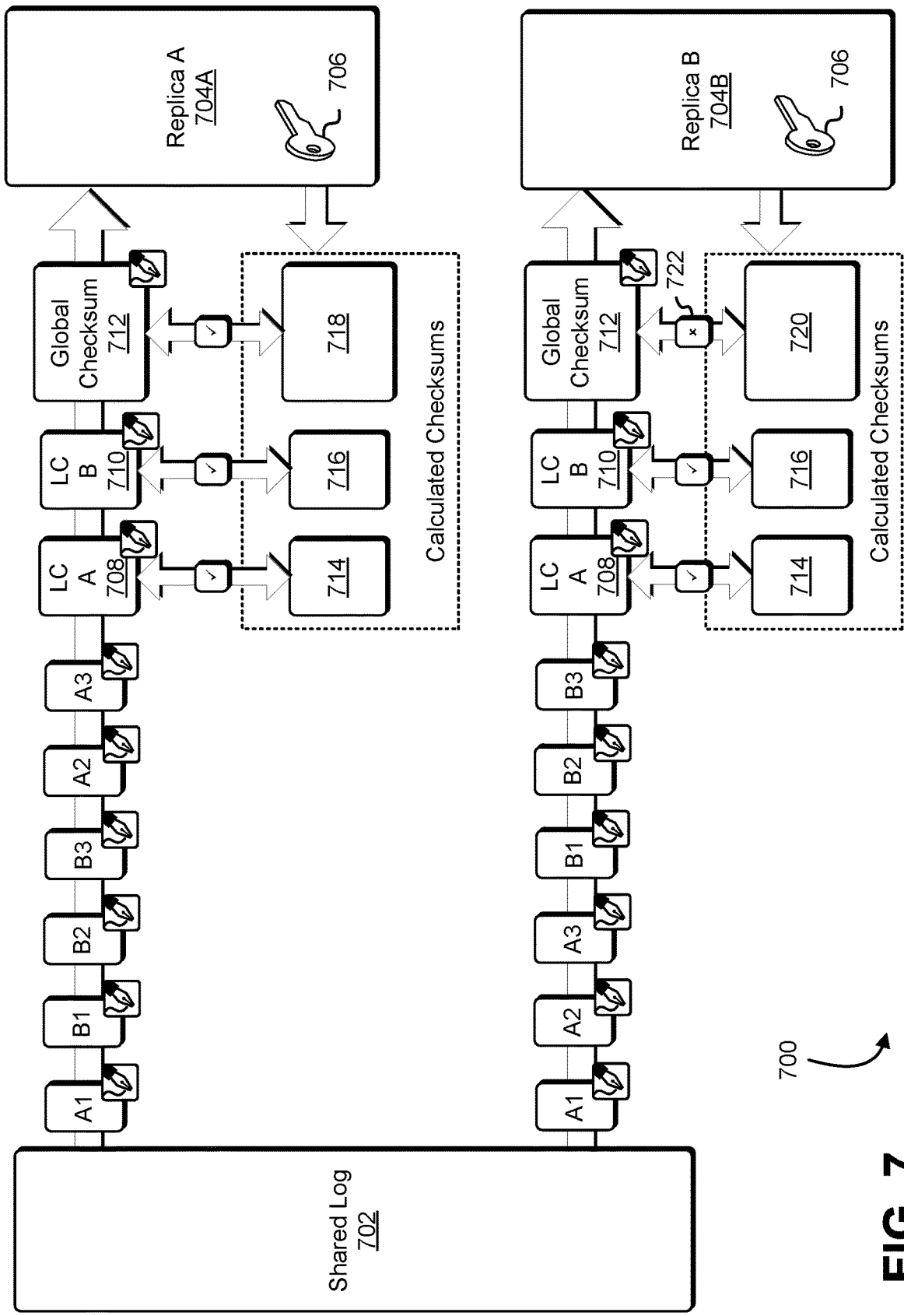
FIG. 7 illustrates a system for using local and global checksums to verify an ordering of operations.

In an embodiment, FIG. 7 illustrates a diagram 700 in which a global ordering is verified using a global checksum 712. In an embodiment, the shared log 702 is a shared log of a distributed database and is hardware, software, or a combination thereof and implemented in accordance with shared logs described elsewhere, such as shared logs described in connection with FIG. 1. In an embodiment, the replicas 704A and 704B are computing entities implemented using hardware, software, or a combination thereof in accordance with those described in connection with FIG. 1. In an embodiment, the replicas 704A and 704B have access to a cryptographic key 706 that is usable to verify digital signatures and/or decrypt data such as the global checksum 712 illustrated in FIG. 7. In an embodiment, the cryptographic key 706 is a symmetric key that is a shared secret accessible to the replicas and a checksum replica agent (not illustrated in FIG. 7) and utilized to encrypt and decrypt data and/or generate and verify digital signatures generated by the replicas and the checksum replica agent (e.g., digital signatures over local and global checksums).

In an embodiment, the global checksum 712 is used to verify a global ordering of operations received from a shared log 702 of a distributed database, such as in the manner illustrated in FIG. 7. In this context, the global ordering refers to a sequence of operations associated with multiple replicas of the distributed database and local orderings refer to sequences of operations that are associated with a particular replica of the distributed database. For example, a first replica 704A receives, from the shared log 702, a set of operations in a first order {A1, B1, B2, B3, A2, A3}, corresponding local checksums 708 and 710, and a global checksum 712. The global checksum 712, in an embodiment, is generated in accordance with techniques described in connection with FIG. 6. In an embodiment, the first replica 704A verifies digital signatures over the local and global checksums using the cryptographic key 706 and verifies the local orderings—in this example, {A1, A2, A3} and {B1, B2, B3} are in order—using techniques described elsewhere, such as in connection with FIG. 5. In an embodiment a replica (e.g., the first replica 704A shown in FIG. 7) verifies the digital signatures over a set of local orderings (which may include multiple local checksums associated with the same replica, local checksums associated with multiple replicas, etc.) and verifies the local orderings by generating hash outputs as calculated checksums 714 and 716 that match the local checksum values provided by the shared log 702. In an embodiment, after all local checksums are verified against the calculated checksum verification values (e.g., calculated local checksums 714 and 716), the global checksum 712 is verified by generating a hash output as calculated checksum 718 based on the ordering of the sequence of operations received from the shared log 702. The hash output may be generated in any suitable manner, such as by using techniques described in connection with FIGS. 4-6. If the generated output matches the received global checksum value, then the sequence of operations received by the first replica 704A is deemed to be in order, and the first replica 704A may, in an embodiment, apply the received operations against the replica's local view of the database by performing the operations against the local view in the order specified by the shared log and subsequently verified. In an embodiment, the first replica 704A performs the verification of local and/or global checksums. In an embodiment, the first replica 704A provides some or all of the data received from the shared log 702 to another entity (e.g., an authentication service of a computing resource service provider) that performs the verification process on behalf of the first replica 704A.

In an embodiment, a global checksum 712 is used to verify when a sequence of operations is received (e.g., as log entries corresponding to the operations) out of order by a second replica 704B. In an embodiment, the correct ordering of operations is the order received by the first replica (i.e., {A1, B1, B2, B3, A2, A3} is the correct order, not {A1, A2, A3, B1, B2, B3} as received by the second replica 704B) and the second replica 704B receives the ordering of operations in a different order, such as is illustrated in FIG. 7. In an embodiment a replica (e.g., the second replica 704B shown in FIG. 7) verifies the digital signatures over a set of local orderings (which may include multiple local checksums associated with the same replica, local checksums associated with multiple replicas, etc.) and verifies the local orderings by generating hash outputs as calculated checksums 714 and 716 that match the local checksum values provided by the shared log 702. In an embodiment, after verifying one or more local checksums are authentic, the second replica 704B generates a hash output as calculated checksum 720 based on the ordering of log entries for operations received from the shared log 702 and determines that the hash output and the global checksum value 712 do not match (as indicated in FIG. 7 by the "x" 722 illustrated in the diagram) and takes one or more actions, such as indicating to an entity (e.g., a logging system or a system administrator) that a global checksum mismatch was detected. In an embodiment, the hash output as calculated checksum 720 is generated at least in part by using local checksum values as inputs to a hash function. In an embodiment, a one-way function may, generally, be utilized where hash functions are referenced.

In an embodiment, replicas receive the global checksum 712 from the shared log 702 as a log entry part of a series of log entries that correspond to database operations and checksums. In an embodiment, checksums are obtained out-of-band (e.g., a separate API request is used to retrieve global checksums from the shared log 702). In an embodiment, the global checksum 712 is obtained from a checksum replica agent such as those described elsewhere in this disclosure (e.g., in connection with FIGS. 1, 5, and 6) via a web API request. In an embodiment, replicas provide an ordering of operations (e.g., one that does not include global checksums) in the form of database log entries to a computing entity (e.g., a checksum replica agent or a service of a computing resource service provider) that has access to the global checksum 712.

It should be noted that in some cases, a sequence that is incorrectly ordered can furthermore generate hash outputs that do not match the local checksums, such as in the case where two operations associated with the same replica are swapped in position, such as was illustrated elsewhere in connection with FIG. 3—as another example, if the ordering of operations {A1, B1, B2, B3, A2, A3} is received in order by the first replica 704A, and the ordering received by the second replica 704B is {A3, A2, A1, B3, B2, B1}, then the hash outputs calculated by the second replica 704B will, generally speaking (e.g., in cases where a hash collision has not occurred), be different from the local checksums 708 and 710 provided by the shared log 702.

Figure 8:
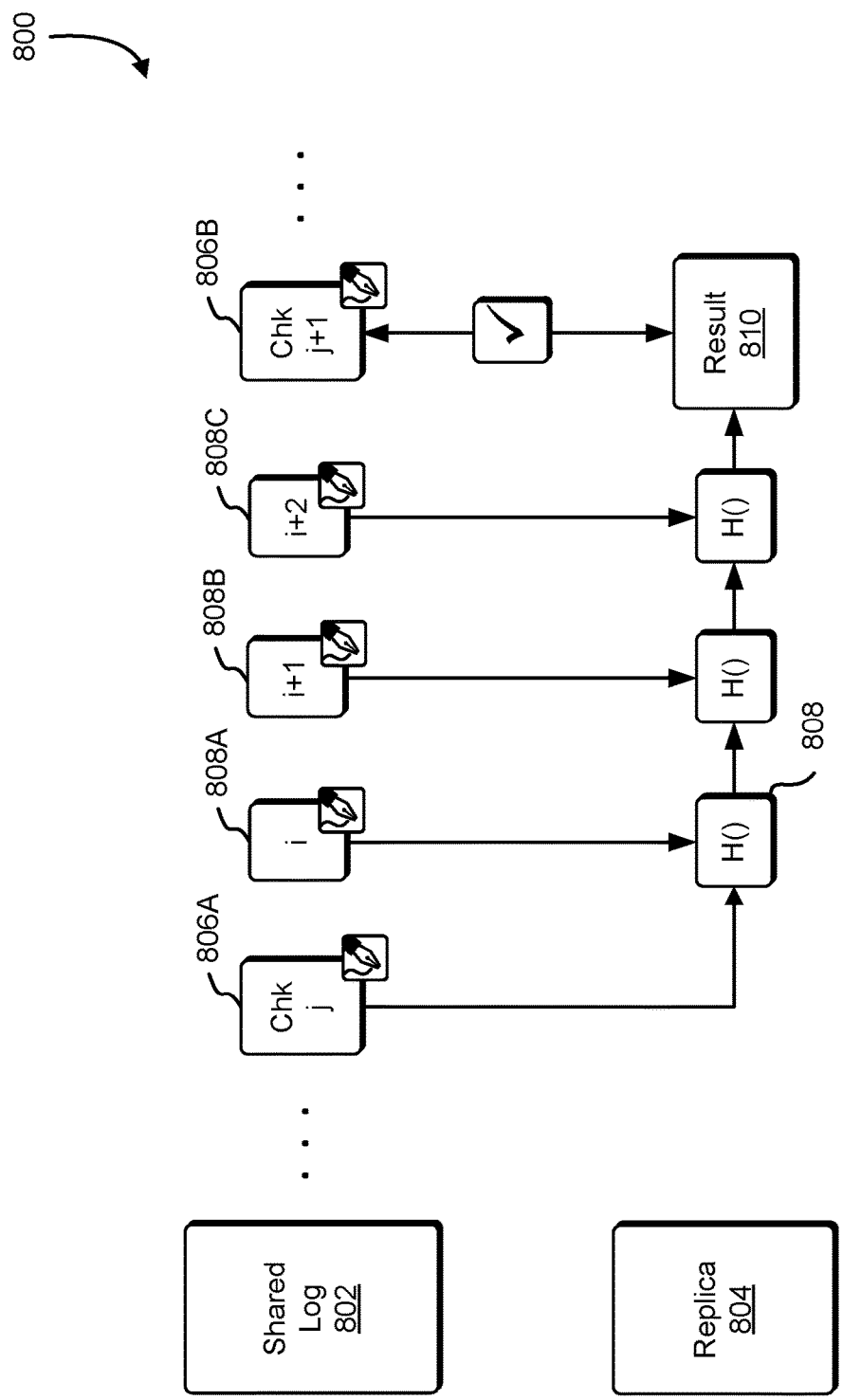
FIG. 8 illustrates a system for generating checksums from other checksums.

In an embodiment, FIG. 8 illustrates a diagram 800 in which a replica 804 verifies a checksum received from a shared log 802 of a distributed database. In an embodiment, the shared log 802 is a shared log of a distributed database is using hardware, software, or a combination thereof that is implemented in accordance with shared logs described elsewhere, such as those described in connection with FIG. 1. In an embodiment, the replica 804 is a computing entity implemented using hardware, software, or a combination thereof in accordance with those described in connection with FIG. 1. FIG. 8 further illustrates log entries associated with a sequence of operations that includes checksums 806A and 806B and operations 808A, 808B, and 808C which, in an embodiment, is received and/or accepted by the replica 804 in order.

In an embodiment, the replica 804 verifies authenticity of the first checksum 806A using techniques discussed elsewhere and determines that the first checksum 806A is authentic (e.g., using a cryptographic key to verify a digital signature associated with the first checksum) and has a correct value (e.g., by generating a hash output that matches the first checksum value). In an embodiment, log entries for the first checksum 806A, the second checksum 806B, and the intervening operations 808A, 808B, and 808C, are usable to verify the ordering of the intervening operations. In an embodiment, the replica 804 determines the first checksum 806A value is correct, and uses the first checksum 806A at least in part as an input to a hash function 808 to generate hash outputs with the log entries for operations 808A, 808B, and 808C which utilizes techniques described elsewhere in this disclosure. In an embodiment, the hash output of result 810 is compared with the second checksum 806B to determine whether the operations are in order. The checksums shown in FIG. 8 can be local checksums and/or global checksums. It should be noted that, in an embodiment, there may be a large number of log entries for operations that precede the first checksum 806A, and that by applying techniques described in connection with FIG. 8, the replica 804 is nevertheless able to generate a hash output for result 810 that matches the second checksum value even without access to log entries for those operations that occurred before the first checksum 806A. In an embodiment, a one-way function may, generally, be utilized where hash functions are referenced.

Figure 9:
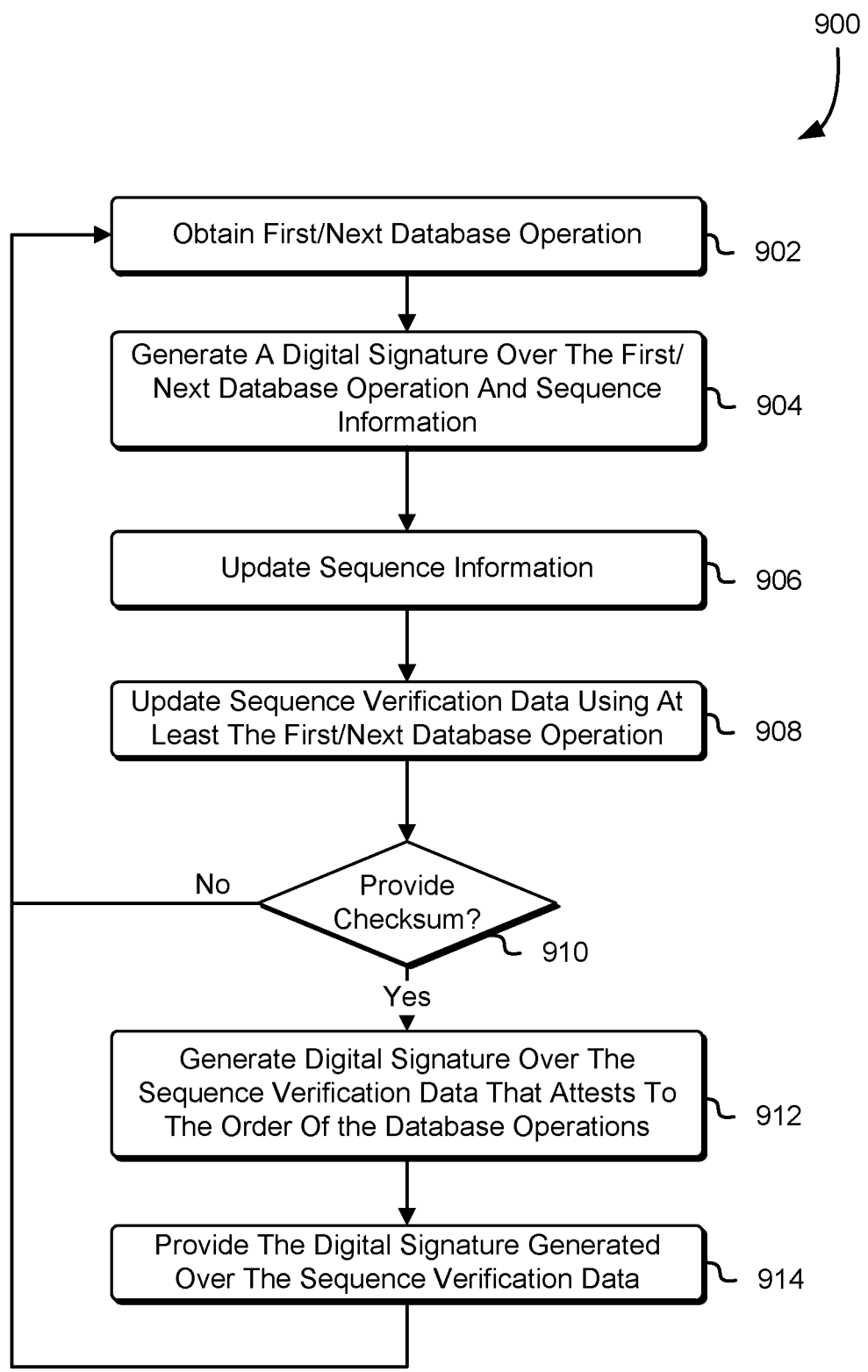
FIG. 9 illustrates a process for generating a checksum that can be utilized to verify an ordering of database operations, in accordance with one embodiment.

FIG. 9 shows an illustrative example of a process that, as a result of being performed by a suitable system, generates checksums that is usable to verify an ordering of database operations. The process illustrated in the flowchart 900 may, generally speaking, be performed by any suitable computing entity such as by a replica to generate a local checksum and/or by a checksum replica agent to generate a global checksum described elsewhere in connection with FIG. 1. As part of the process, the system, in an embodiment, obtains 902 a request to perform a first database operation. Generally speaking, the operations obtained by the system may refer to all operations performed locally on the replica or a subset that includes particular types of operations and/or excludes particular types of operations—for example, in an embodiment write-related database operations (e.g., those operations related to creating, updating, and deleting database records, modifying database configuration settings, creating, updating, and deleting database tables and/or indices, and more) are recorded; in an embodiment, database transaction operations (e.g., operations related to starting, committing, and aborting transactions) are recorded; in an embodiment, all operations except for read-related operations (e.g., operations that read a database record, query a view of a database table, and other types of operations that do not change the state of the database). Database operations may be batched (e.g., several individual operations may be aggregated and applied as a group, which may improve efficiency, decrease battery usage, decrease memory usage, and more). In an embodiment, a checksum replica agent obtains the operations from a shared log and the sequence of operations is associated with multiple replicas.

In an embodiment, the system generates 904 a digital signature based at least in part on the first database operation or first batch of database operations which also encodes sequence information. In an embodiment, as part of fulfilling a request to perform a database operation, a corresponding log entry is generated, and the digital signature is generated over the log entry. In an embodiment, the digital signature is generated over a machine-readable command such as a SQL statement. In an embodiment, the sequence information is a counter that is incremented for each digital signature generated, incremented for each operation, and so on. Generally speaking, the sequence information is information usable to determine the correct order of operations. In an embodiment, the sequence information may be encoded in the database operation, such as by using an auto-incrementing counter.

In an embodiment, the sequence information is updated 906 in connection with the generating 904 of the digital signature, such as by incrementing a counter that tracks how many digital signatures have been generated by the system, how many requests to perform database operations have been fulfilled by the system, and more. It should be noted that while the ordering of the operations shown in FIG. 9 illustrate the digital signature being generated at a first step 904 and the sequence information being updated at a second step 906 that operations need not occur in the manner illustrated—for example, the sequence information can be updated before the digital signature is generated.

In an embodiment, the system updates 908 sequence verification data using at least the first database operation. In an embodiment, the sequence verification data is the hash outputs generated by a replica in connection with FIGS. 1-4. Generally, the sequence verification data is any data that is usable determine whether a sequence of operations is in order.

In an embodiment, the system determines whether 910 to provide a checksum. The checksum is generated, in an embodiment, using techniques described elsewhere in connection with FIGS. 1-4. In an embodiment, the system determines to generate a checksum every N operations (e.g., based on a counter C, determining when C % N==0, wherein the double equals "==" symbol refers to an equality operator that denotes the left-hand side and right-hand side of the expression are equal and the "%" symbol refers to the modulo operator for finding the remainder when counter C is divided by N). In an embodiment, the system generates a checksum for each database operation or batch of database operations (e.g., N=1 or where the system is programmatically coded to generate checksums after each database operation). In an embodiment, the rate at which digital signatures is generated is controlled based on traffic (e.g., N is tuned based on the rate of requests received by a replica) such that as the rate of requests received by a system increases, the checksums are generated can vary. In an embodiment, a publication-subscription framework is used to generate checksums wherein the system subscribes for notifications (e.g., from a notification service of a computing resource service provider) which pushes notifications to subscribers, such as a notification to generate a checksum. In an embodiment, the value N is predetermined. In an embodiment, the value N is specified and can be changed via an API command.

If the system determines not to generate a checksum, the system, in an embodiment, receives a next log entry for a next database operation 902 and performs the steps 902-908 such as in the manner described in connection with FIGS. 1-4. In an embodiment, the sequence verification data generated by the next database operation is based at least in part on the previous sequence verification data value, such as in the case where the previous value is used at least in part as an input to a hash function used to generate a hash output that is associated with the sequence verification data. In an embodiment, a one-way function may, generally, be utilized where hash functions are referenced.

If the system determines to generate a checksum, the system generates 912 a digital signature over the sequence verification data (e.g., hash output) with an indication as to the ordering of database operations. The indication, in an embodiment, is implied, such as where a hash output value is included in the digital signature and can be generated by receiving log entries for a sequence of database operations in order and performing a hashing process such as by using techniques described elsewhere in connection with FIG. 5. In an embodiment, the digital signature is encrypted in addition to or in place of the digital signature. In an embodiment, the digital signature is generated using a symmetric cryptographic key that is accessible to other replicas of a distributed database as well as a checksum replica agent (which may, furthermore, be a component of a replica), and is inaccessible to a shared log of the distributed database. If the system is a replica, it may generate a local checksum based on operations that were applied locally, wherein the local checksum is usable to determine a local ordering of operations associated with the replica. If the system is a checksum replica agent, it may generate a global checksum based on operations from one or more replicas that contributed to a shared log, wherein the global checksum is usable to determine a global ordering of operations associated with multiple replicas.

In an embodiment, the system provides 914 the sequence verification data and the corresponding digital signature. In an embodiment, the sequence verification data is the hash output corresponding to a local and/or global checksum as described in connection with FIGS. 1-8. In an embodiment, a replica provides a local checksum (e.g., digitally signed and/or encrypted) to a shared log of a distributed database. In an embodiment, a checksum replica agent provides a global checksum (e.g., digitally signed and/or encrypted) to a shared log of a distributed database.

Figure 10:
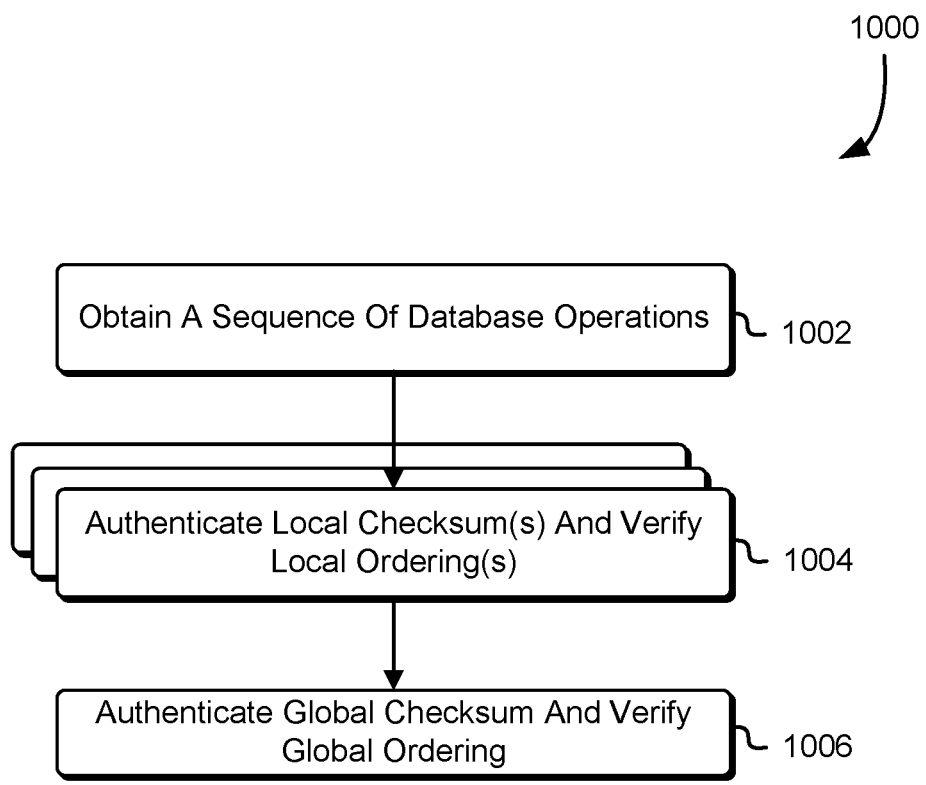
FIG. 10 illustrates a process for verifying a sequence of operations is in a correct order, in accordance with one embodiment.

FIG. 10 shows an illustrative example of a process that, as a result of being performed by a suitable system, verifies a sequence of operations is in a correct order. The process illustrated in the flowchart 1000 may, generally speaking, be performed by any suitable computing entity such as by a replica to generate a local checksum and/or by a checksum replica agent to generate a global checksum described elsewhere in connection with FIG. 1. As part of the process, the system, in an embodiment, obtains 1002 a sequence of database operations, such as from log entries corresponding to the database operations. In an embodiment, the system obtains a sequence of machine-readable commands such as SQL statements. In an embodiment, a shared log of a distributed database provides (e.g., in response to a transition request) an ordered list of database operations to a replica of the distributed database to update the replica's local view—the replica may perform the process shown in FIG. 10 to verify that the operations were received in order prior to applying the operations to the replica's local view. In an embodiment, the operations are ordered either implicitly (e.g., the order in which the data was transited and/or received is the order of the operations) or explicitly (e.g., an index value is associated with each operation or batch of operations).

In an embodiment, the system is a replica of a distributed database and verifies 1004 the authenticity of one or more digital signatures generated over log entries for the database operations (e.g., database write operations). In an embodiment, the replica verifies the authenticity of one or more digital signatures generated over local checksums. In an embodiment, the digital signatures are verifiable using a cryptographic key (e.g., a public key) accessible to replicas of a distributed database, a checksum replica agent, a shared log, and more. In an embodiment, the log entries for the database operations are parsed to determine a subset of the operations attributable to a replica and the subset of operations is used to generate a hash output that is compared against a corresponding local checksum for that replica. It should be noted that in some cases, such as where all operations are attributable to one replica, the subset described in this context refers to the entire set of operations. As illustrated in FIG. 7 by the multiple boxes around step 1004, this process may be performed for multiple replicas such that multiple mutually exclusive subsets are determined and multiple hash outputs are generated and matched against the local checksums associated with the respective replicas. The local orderings may be verified in the manner described elsewhere in connection with FIGS. 1-8.

In an embodiment, the system is a replica of a distributed database and verifies 1006 the authenticity of a digital signature generated over a global checksum. In an embodiment, the data that is digitally signed is in an encoded format (e.g., encrypted format). In an embodiment, the database operations are used to generate a hash output that is compared against the global checksum for the distributed database. In an embodiment, the global checksum is verified in accordance with techniques described elsewhere in connection with FIGS. 1-8.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. One-way functions may include, but are not limited to, cryptographic functions that accept at least a plaintext and a cryptographic key as inputs and generate at least a ciphertext as an output (e.g., an encryption function). The output may be such that an entity with the output of the cryptographic operation is unable, without access to particular secret information, determine the input without performing an extraordinary expenditure of computing resources. For example, a one-way function may include an RSA encryption function such that the RSA encryption function accepts as inputs a plaintext and a public key and generates a ciphertext output that an entity without the corresponding private key is unable to solve in a feasible manner. While the input may be determinable to an entity without the private key through performing an integer factorization (e.g., a prime factorization), no known algorithm exists to solve the integer factorization problem in polynomial time using conventional computer systems. A one-way function may be used to perform a cryptographic derivation such that an input to the one-way function may be used to cryptographically derive an output in a manner that an entity without access to the corresponding input may not be able to determine the input without extraordinary expenditure of computational resources. An extraordinary expenditure of computational resources may refer to using computational resources to perform a computation whose run time complexity is not known to have an upper bound that can be represented by a polynomial expression.

Figure 11:
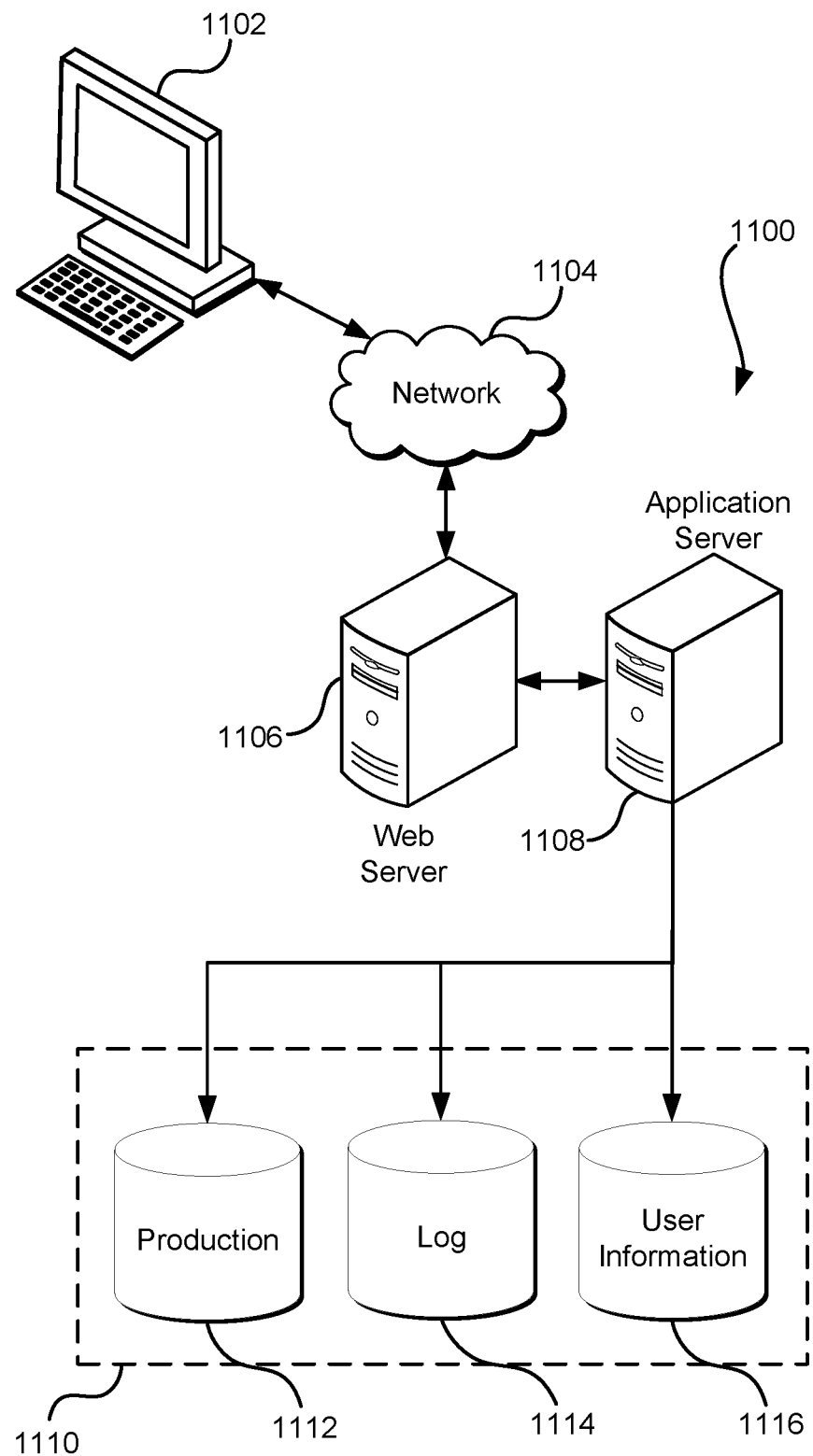
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, in response to a request from a computing entity, a log comprising a plurality of operations collectively generated by a plurality of computer systems;
    obtaining a third attestation indicating the plurality of operations is correctly ordered, wherein the third attestation is generated using a third cryptographic key inaccessible to the plurality of computer systems, and further wherein:
        a first attestation indicates a first subset of the plurality of operations generated by a first computer system is correctly ordered, wherein the first attestation is generated using a first cryptographic key associated with the first computer system; and
        a second attestation indicates a second subset of the plurality of operations generated by a second computer system is correctly ordered, wherein the second attestation is generated using a second cryptographic key associated with the second computer system;
    calculating a value based at least in part on the log of the plurality of operations obtained, wherein:
        the value is calculated based at least in part on an ordering of the plurality of operations that satisfies orderings of the first and second subsets respectively according to the first attestation and the second attestation, and
        the value is calculated as a different value based at least in part on a different ordering of the plurality of operations that satisfies the orderings of the first and second subsets respectively according to the first attestation and the second attestation; and
    as a result of the value and the third attestation matching, performing one or more operations using at least a portion of the log.

2. The computer-implemented method of claim 1, wherein the third attestation indicates whether the ordering of the plurality of operations has been altered, further wherein the different ordering of the plurality of operations is parsed to generate outputs that match the first attestation and the second attestation.

3. The computer-implemented method of claim 1, wherein the first attestation comprises a hash output of a hash function derived at least in part from each operation of the first subset of the plurality of operations and a sequence number of the request.

4. The computer-implemented method of claim 1, wherein the first, second, and third attestations are generated for subsets of a predetermined size.

5. A system, comprising:
    one or more processors; and
    memory storing executable instructions that, as a result of execution by the one or more processors, cause the system to:

obtain:
  an ordered plurality of operations comprising a first subset of operations generated by a first computing entity and a second subset of operations generated by a second computing entity;
  a first attestation generated by the first computing entity; and
  a second attestation generated by the second computing entity;
compute a first output based at least in part on the first subset of operations;
compute a second output based at least in part on the second subset of operations;
determine the ordered plurality of operations has a valid order based at least in part on the first output matching the first attestation and the second output matching the second attestation, wherein the valid order of the ordered plurality of operations is verifiable by generating a conflict set from one or more operations of the ordered plurality of operations;
as a result of determining that the ordered plurality of operations has the valid order, generate a third attestation based at least in part on the ordered plurality of operations, wherein the third attestation indicates whether the valid order has been altered, and further wherein a different ordering of the ordered plurality of operations is parsed to generate outputs that match the first attestation and the second attestation; and
provide, in response to a request from a computing entity, the third attestation for verifying the valid order of the ordered plurality of operations.

6. The system of claim 5, wherein the instructions to compute the first output based at least in part on the first subset of operations include instructions that, as a result of execution, cause the system to:
parse the ordered plurality of operations to obtain the first subset of operations; and
iteratively hash values associated with operations of the first subset of operations and a sequence number of the request to calculate the first output.

7. The system of claim 5, wherein the ordered plurality of operations are an ordered plurality of database operations that are to be applied, in order, by a plurality of database replicas that includes the first and second computing entities.

8. The system of claim 7, wherein a database replica of the plurality of database replicas generates the conflict set from one or more database operations of the ordered plurality of database operations.

9. The system of claim 5, wherein the instructions to generate the third attestation include instructions that, as a result of execution, cause the system to generate the third attestation by at least iteratively hashing at least the ordered plurality of operations.

10. The system of claim 9, wherein the first attestation and the second attestation are also iteratively hashed with the ordered plurality of operations to generate the third attestation.

11. The system of claim 5, wherein the first, second, and third attestations are digital signatures.

12. The system of claim 5, wherein:
the first attestation indicates how to correctly order operations of the first subset;
the second attestation indicates how to correctly order operations of the second subset; and
the third attestation indicates how to correctly order all operations of the ordered plurality of operations.

13. A non-transitory computer-readable storage medium storing executable instructions that, as a result of execution by one or more processors of a computer system, cause the computer system to:
obtain a log comprising a plurality of operations collectively generated by a plurality of computing entities;
obtain, in response to a request, a third attestation indicating the plurality of operations are correctly ordered, wherein the third attestation is generated using a third cryptographic key inaccessible to the plurality of computing entities, and further wherein:
  a first attestation indicates a first subset of the plurality of operations generated by first computing entities is correctly ordered, wherein the first attestation is generated based on the request using a first cryptographic key associated with the first computing entities; and
  a second attestation indicates a second subset of the plurality of operations generated by second computing entities is correctly ordered, wherein the second attestation is generated using a second cryptographic key associated with the second computing entities;
calculate a value based at least in part on the log comprising the plurality of operations obtained, wherein:
  the value is calculated based at least in part on an ordering of the plurality of operations that satisfies orderings of the first and second subsets respectively according to the first attestation and the second attestation, and
  the value is calculated as a different value based at least in part on a different ordering of the plurality of operations that satisfies the orderings of the first and second subsets respectively according to the first attestation and the second attestation; and
as a result of the value and the third attestation matching, perform one or more operations from at least a portion of the log.

14. The non-transitory computer-readable storage medium of claim 13, wherein the plurality of operations are database operations and the plurality of computing entities are database replicas.

15. The non-transitory computer-readable storage medium of claim 14, wherein:
the computer system is a database replica; and
the one or more operations are one or more operations to process the database operations, in order, to update the database replica.

16. The non-transitory computer-readable storage medium of claim 13, wherein the instructions to calculate the value include instructions that, as a result of execution by the one or more processors, cause the computer system to iteratively hash the plurality of operations based on an ordering indicated by the third attestation.

17. The non-transitory computer-readable storage medium of claim 13, wherein the plurality of operations excludes operations that do not modify database state.

18. The non-transitory computer-readable storage medium of claim 13, wherein the executable instructions include further instructions that, as a result of being executed by the one or more processors, further cause the computer system to:
generate a conflict set from the plurality of operations, wherein the conflict set is used for verifying that the plurality of operations are correctly ordered.

19. The non-transitory computer-readable storage medium of claim 13, wherein the computer system is a third computing entity of the plurality of computing entities.

20. The non-transitory computer-readable storage medium of claim 13, wherein the third attestation corresponds to a global ordering of operations generated by the plurality of computing entities.

\* \* \* \* \*